United States Patent [19]
Murai et al.

[11] Patent Number: 5,959,707
[45] Date of Patent: Sep. 28, 1999

[54] LIQUID CRYSTAL DISPLAY HAVING DOMAINS WITH DIFFERENT TILTED-UP DIRECTIONS AS WELL AS DOMAINS WITH DIFFERENT TWIST DIRECTIONS OF LC MOLECULES

[75] Inventors: Hideya Murai; Masayoshi Suzuki, both of Tokyo, Japan

[73] Assignee: NEC Corporation, Tokyo, Japan

[21] Appl. No.: 08/636,986

[22] Filed: Apr. 24, 1996

[30] Foreign Application Priority Data

| Apr. 24, 1995 | [JP] | Japan | 7-098336 |
| Jun. 12, 1995 | [JP] | Japan | 7-144442 |
| Jun. 19, 1995 | [JP] | Japan | 7-151326 |
| Sep. 26, 1995 | [JP] | Japan | 7-273614 |
| Jan. 12, 1996 | [JP] | Japan | 8-021828 |
| Feb. 20, 1996 | [JP] | Japan | 8-032382 |

[51] Int. Cl.$^6$ ........... G02F 1/1337; G02F 1/1333; G02F 1/141; G02F 1/1343
[52] U.S. Cl. ........... 349/129; 349/88; 349/134; 349/139; 349/143
[58] Field of Search ........... 349/143, 88, 139, 349/134, 129

[56] References Cited

U.S. PATENT DOCUMENTS

| 5,247,379 | 9/1993 | Anderson et al. | 349/179 |
| 5,309,264 | 5/1994 | Lien et al. | 349/143 |
| 5,453,862 | 9/1995 | Toko et al. | 359/76 |
| 5,473,450 | 12/1995 | Yamada et al. | 349/89 |
| 5,479,282 | 12/1995 | Toko et al. | 359/75 |
| 5,508,832 | 4/1996 | Shimada | 359/76 |
| 5,576,862 | 11/1996 | Sugiyama et al. | 359/75 |
| 5,576,863 | 11/1996 | Aoki et al. | 359/76 |
| 5,623,354 | 4/1997 | Lien et al. | 349/124 |
| 5,646,705 | 7/1997 | Higuchi et al. | 349/143 |
| 5,668,651 | 9/1997 | Yamada et al. | 349/156 |
| 5,686,978 | 11/1997 | Oh | 349/93 |
| 5,717,474 | 2/1998 | Sarma | 349/85 |
| 5,831,700 | 11/1998 | Li et al. | 349/88 |

FOREIGN PATENT DOCUMENTS

| 0 497 619 | 8/1992 | European Pat. Off. . |
| 0 626 606 | 11/1994 | European Pat. Off. . |
| 0 632 311 | 1/1995 | European Pat. Off. . |
| 0 636 917 | 2/1995 | European Pat. Off. . |
| 7-84260 | 3/1995 | Japan . |
| WO 92/19695 | 11/1992 | WIPO | 349/1 |

*Primary Examiner*—William L. Sikes
*Assistant Examiner*—Tarifur R. Chowdhury
*Attorney, Agent, or Firm*—Young & Thompson

[57] ABSTRACT

A nematic liquid crystal display includes a first substrate provided with a common electrode, a second substrate provided with a pixel electrode, the second substrate being arranged to extend in parallel to the first substrate, and a liquid crystal cell which includes a nematic liquid crystal with a splay distortion. In the liquid crystal domains of a first type which are different in tilted-up direction of liquid crystal molecules coexist, and domains of a second type which are different in twist direction of liquid crystal molecules coexist. The liquid crystal may include a polymer that is a polymerized monomer or oligomer.

20 Claims, 30 Drawing Sheets

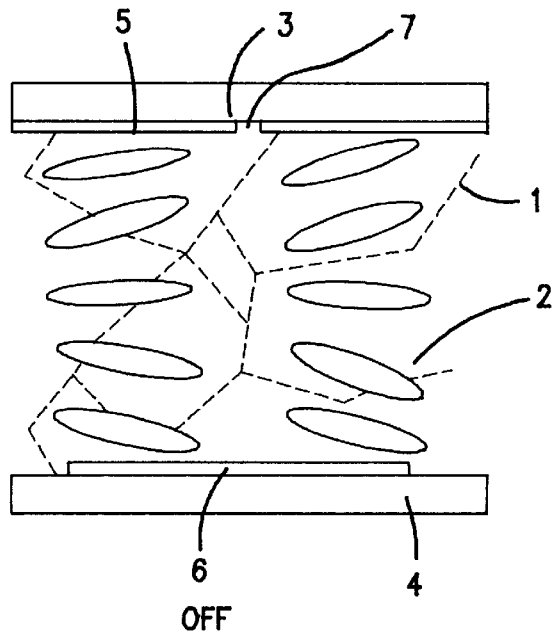
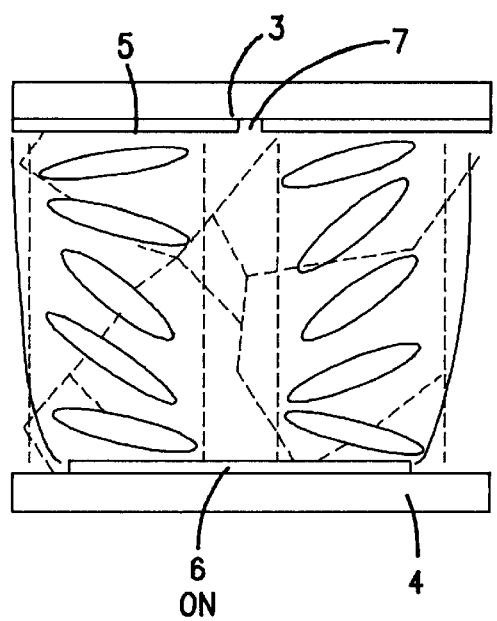
FIG. 14
FIG. 15
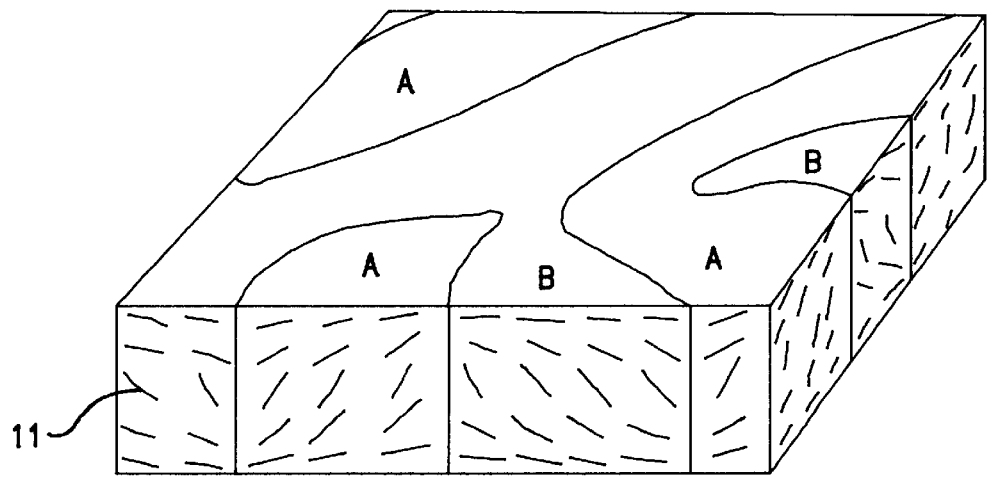
FIG. 16

LIQUID CRYSTAL DISPLAY HAVING DOMAINS WITH DIFFERENT TILTED-UP DIRECTIONS AS WELL AS DOMAINS WITH DIFFERENT TWIST DIRECTIONS OF LC MOLECULES

BACKGROUND OF THE INVENTION

The present invention relates to a liquid crystal display, and more particularly to a twisted nematic liquid crystal display showing a high contrast and a wide angle of visibility. The present invention also relates to a method for fabricating a liquid crystal display as well as a method for driving the same.

The conventional liquid crystal display has a relatively narrow angle of visibility due to a unique action of the liquid crystal. The reason for the narrow angle of visibility will be described with reference to a twisted nematic liquid crystal display driven by thin film transistors. FIG. 1 illustrates twisted nematic liquid crystal molecules between two glass substrates when no voltage is applied to the liquid crystal. FIG. 2 illustrates the twisted nematic liquid crystal molecules between the two glass substrates when a voltage for driving the display is applied to the liquid crystal.

As illustrated in FIGS. 1 and 2, liquid crystal molecules 11 have a slender shape. A longitudinal direction of the liquid crystal molecule may be referred to as a direction of the liquid crystal molecule. When no voltage is applied to the liquid crystal, the liquid crystal molecules 11 adjacent to the substrates 23 and 33 are pretilted by a pretilted angle 13 from the surfaces of the substrates 23 and 33. Since the pretilted angle 13 is small, the liquid crystal molecules 11 are aligned nearly parallel to the surfaces of the substrates 23 and 33.

A horizontal direction of the liquid crystal molecule 11 may be referred to as an orientation of the liquid crystal molecule 11. The liquid crystal molecules 11 aligned between the substrates 23 and 33 are twisted around an axis perpendicular to the surfaces of the substrates 23 and 33 so that the liquid crystal molecule 11 on the surface of the substrate 33 differs in orientation by 90 degrees from the liquid crystal molecule 11 on the surface of the substrate 23. Such twist of the liquid crystal molecules 11 aligned between the substrates 23 and 33 is not illustrated in FIGS. 1 and 2.

There is no remarkable dependency of the visibility upon the direction of view because the liquid crystal molecules 11 are aligned nearly parallel to the surfaces of the substrates 23 and 33.

When a voltage is applied to the liquid crystal molecules 11 aligned between the substrates 23 and 33, then the directions of the liquid crystal molecules 11 are changed as illustrated in FIG. 2. The directions of the liquid crystal molecules 11 apart from the surfaces of the substrates 23 and 33 are largely changed to approach the vertical direction, whilst the direction of the liquid crystal molecules 11 adjacent to the surfaces of the substrates 23 and 33 almost remains unchanged from the pretilted angle 13. In FIG. 2, the liquid crystal molecules 11 are directed to "right-up". As the liquid crystal molecules 11 approach to the vertical direction, a transmissivity of a ray of light is raised. This means that when a voltage is applied to the liquid crystal, the transmissivity of a ray of light is raised whereby a color of the display approaches dark or black, assuming that a display is operational in a normally-white mode. By contrasts, as illustrated in FIG. 1, if no voltage is applied to the liquid crystal then the transmissivity of a ray of light is dropped and a probability of scattering of light by the parallel liquid crystal molecules 11 is raised. Those result in that a color of the display approaches white.

During no voltage application, the directions of the liquid crystal molecules 11 remain relatively parallel to the surfaces of the substrates 23 and 33 as illustrated in FIG. 1. Notwithstanding, during the voltage application, the liquid crystal molecules 11 have large tilted angles from the surfaces of the substrates 23 and 33 and approach to the "right-up" as illustrated in FIG. 2. In the latter case, a ray of light 41 is directed nearly parallel to the largely tilted directions of the liquid crystal molecules 11 apart from the surfaces of the substrates 23 and 33, whilst a ray of light 42 is, however, directed nearly vertical to the largely tilted directions of the liquid crystal molecules 11 apart from the surfaces of the substrates 23 and 33. Needless to say, a transmissivity of the ray of light 41 is much higher than a transmissivity of the ray of light 42. This means that if a direction of view is parallel to the direction of the ray of light 41 then the color of display approaches to the dark or black. If, however, a direction of view is parallel to the direction of the ray of light 42 then the color of display approaches to the white. Namely, the visible property of the conventional liquid crystal display largely depends on the direction of view. For those reasons, the conventional liquid crystal display has a relatively narrow angle of visibility.

In order to settle the above problem, another conventional liquid crystal display illustrated in FIG. 3 was proposed, which utilizes a spray distortion of liquid crystal molecules 2 aligned between a common electrode 5 provided on a substrate 3 and a pixel electrode provided on a substrate 4. This conventional liquid crystal display is disclosed in the Japanese laid-open patent application No. 4-149410. FIG. 3 illustrates the liquid crystal molecules 2 when no voltage is applied thereto. The liquid crystal molecule 2 adjacent to the common electrode 5 on the upper substrate 3 differs in pretilted angle from the liquid crystal molecule 2 adjacent to the pixel electrode 6 on the bottom substrate 4. For example, the liquid crystal molecule 2 adjacent to the common electrode 5 on the upper substrate 3 is directed to a right-up direction, whilst the liquid crystal molecule 2 adjacent to the pixel electrode 6 on the bottom substrate 4 is directed to a left-up direction. The liquid crystal molecule 2 adjacent to the common electrode 5 on the upper substrate 3 is mismatched in pretilted angle to the liquid crystal molecule 2 adjacent to the pixel electrode 6 on the bottom substrate 4. In this case, the liquid crystal molecules 2 aligned between the top and bottom substrates 3 and 4 have a spray distortion. The liquid crystal molecule 2 positioned at an intermediate position between the top and bottom substrates 3 and 4 is directed almost parallel to the surfaces of the top and bottom substrates 3 and 4.

When a voltage is applied to the liquid crystal molecules 2, the liquid crystal molecules 2 particularly positioned apart from the top and bottom substrates 3 and 4 show change of directions but only in vertical component as illustrated in FIG. 4. The common electrode 5 differs in area from the pixel electrode 6. Since the area of the pixel electrode 6 is smaller than the common electrode 5, a slight field concentration appears in the vicinity of the pixel electrode 6. Namely, the field flux shows a slight convergence in the vicinity of the pixel electrode 6. In a right half domain 15, the liquid crystal molecules apart from the pixel electrode 6 on the bottom substrate 4 are directed to a right-up direction, whilst in a left half domain 14, the liquid crystal molecules apart from the pixel electrode 6 on the bottom substrate 4 are directed to a left-up direction. A ray of light 12-1 is directed to have a small angle to the right-up direction of the liquid crystal molecules in the right half domain 15, but to have a large angle to the left-up direction of the liquid crystal molecules in the left half domain 14. For those reasons, the ray of light 12-1 has a large transmissivity to the liquid crystal molecules in the right half domain 15, but a small transmissivity to the liquid crystal molecules in the left half domain 14. By contrast, a ray of light 12-2 is directed to have a large angle to the right-up direction of the liquid crystal molecules in the right half domain 15, but to have a small angle to the left-up direction of the liquid crystal molecules in the left half domain 14. For those reasons, the ray of light 12-2 has a small transmissivity to the liquid crystal molecules in the right half domain 15, but a large transmissivity to the liquid crystal molecules in the left half domain 14. This means that the right half domain 15 has a different optical property from that of the left half domain 14. The optical property is symmetrical between the right and left half domains 15 and 14. This may prevent any inversion of the black-white colors and whiteness.

FIG. 5 illustrates still another conventional liquid crystal display similar to the above display but differs in providing an opening 7 in a common electrode 5, wherein a voltage is applied to the liquid crystal. This display is disclosed in the Japanese laid-open patent application No. 6-43461. Electric field applied is not uniform due to the opening 7 of the common electrode 5 and a difference in area between the common electrode 5 and the pixel electrode 6. The common electrode 5 differs in area from the pixel electrode 6. Since the area of the pixel electrode 6 is smaller than the common electrode 5, a slight field concentration appears in the vicinity of the pixel electrode 6. Namely, the field flux shows a slight convergence in the vicinity of the pixel electrode 6. In a right half domain 15, the liquid crystal molecules apart from the pixel electrode 6 on the bottom substrate 4 are directed to a right-up direction, whilst in a left half domain 14, the liquid crystal molecules apart from the pixel electrode 6 on the bottom substrate 4 are directed to a left-up direction. A ray of light 12-1 is directed to have a small angle to the right-up direction of the liquid crystal molecules in the right half domain 15, but to have a large angle to the left-up direction of the liquid crystal molecules in the left half domain 14. For those reasons, the ray of light 12-1 has a large transmissivity to the liquid crystal molecules in the right half domain 15, but a small transmissivity to the liquid crystal molecules in the left half domain 14. By contrast, a ray of light 12-2 is directed to have a large angle to the right-up direction of the liquid crystal molecules in the right half domain 15, but to have a small angle to the left-up direction of the liquid crystal molecules in the left half domain 14. For those reasons, the ray of light 12-2 has a small transmissivity to the liquid crystal molecules in the right half domain 15, but a large transmissivity to the liquid crystal molecules in the left half domain 14. Those mean that the right half domain 15 has a different optical property from that of the left half domain 14. The optical property is symmetrical between the right and left half domains 15 and 14. This may prevent any inversion of the black-white colors and whiteness.

The above second and third liquid crystal displays illustrated in FIGS. 3–5 have the following problems. The liquid crystal molecules 2 positioned at a boundary between the right and left half domains 14 and 15 are kept to have a parallel direction to the surfaces of the top and bottom substrates 3 and 4 even when a voltage is applied to the liquid crystal. For this reason, the permissivity of the ray of light transmitting through the boundary between the right half and left half domains is lower than that of the ray of light transmitting through the right half and left half domains. Namely, the probability of scattering of the ray of light transmitting through the boundary between the right half and left half domains is higher than that of the ray of light transmitting through the right half and left half domains. As a result, the boundary between the right half and left half domains still remains somewhat white even the voltage is applied to the liquid crystal. The color of the boundary between the right half and left half domains does not become dark or black. Namely, the ray of light having transmitted through the boundary between the right half and left half domains is relatively white. This reduces a contrast between the white mode in no voltage application and the black mode in a voltage application.

In order to settle the above problems with whiteness, it was proposed to provide an optical shielding layer at the boundary between the right half and left half domains whereby the ray of the whiteness light having transmitted through the boundary between the right half and left half domains may be shielded by the optical shielding layer. The optical shielding layer may ideally prevent the whiteness of the display in the black mode when the voltage is applied to the liquid crystal.

Actually, the above liquid crystal display provided with the optical shielding layer at the boundary between the right half and left half domains is, however, has a problem with movement of the boundary between the first and second domains when a voltage is applied to the liquid crystal.

In FIG. 6, domains X are positioned outside domains Z which surround a domain Y positioned at a center. The electric field in the domains Z is uniform and just perpendicular to the surfaces of the top and bottom substrates 3 and 4, but in the domains X and Y the electric field is not uniform. In the domains X and Y, the liquid crystal molecules adjacent to the glass substrates 23 and 33 are directed in a direction H or L toward which the liquid crystal molecules are raised by the pretilted angle. Both the directions H and L are defined by rubbing as illustrated in FIG. 7. By contrast, in the domains Z, the liquid crystal molecules adjacent to the glass substrates 23 and 33 are, in random, directed in the directions H and L. Namely, there are two different domains H and L within which the liquid crystal molecules adjacent to the substrates 23 and 33 are raised by the pretilted angle toward the different directions H and L respectively. The boundary between the domains H and L are changed from immediately after the voltage is applied to the liquid crystal. FIG. 8 illustrates change of the boundary between the domains H and L from immediately after the voltage is applied to the liquid crystal. When the voltage application commenced, first liquid crystal molecules adjacent to the edge of the electrodes or in the peripheral region of the electrode do respond so that the liquid crystal molecules in the right bottom region and in the left top region are directed to the directions H and L respectively. Namely, the peripheral regions of the electrode in the right bottom region and in the left top region become the domain H and the domain L respectively, immediately after the voltage application commenced. On the other hand, at this time, the center regions except for the peripheral region of the electrode have the two domains H and L. Namely, the two domains H and L still coexist in the center regions except for the peripheral region of the electrode. With time, a region, where the coexistence of the two domains H and L, becomes narrow and is converged to a center position of the right bottom region and the left top region and then the right bottom region is entirely shared by the domain H while the left top region is entirely shared by the domain L. In the above processes, the boundary between the domains H and L is moved. Further, a time when the domain L disappeared in the left top region may differ from a time when the domain H disappeared. As well illustrated in FIG. 8, the boundary between the domains H and L are changed over positions after the voltage application to the liquid crystal commenced. Further, as described with reference to FIGS. 4 and 5, the boundary between the two different domains H and L has the problem with the whiteness of the ray of light having transmitted through the boundary and therefore it is necessary to shield the ray of such white light by providing a shielding layer in order to obtain a black color of the display in the black mode when a voltage is applied. Actually, however, the boundary between the two different domains H and L moves after the voltage application commenced, whilst the shielding layer is of course fixed. The movement of the boundary between the two different domains H and L does make it impossible to shield, by a shielding layer fixed, the ray of whiteness light having transmitted through the boundary. Further, it takes not less than 1 sec. until the domains H and L are stabilized and the boundary between them is fixed. During this, the boundary between the domains H and L are kept to move and draw a white line as a residual image on the display. The above phenomenon appears on the liquid crystal display illustrated in FIGS. 3 and 4.

If a rectangular-shaped opening is provided to extend parallel to one side of the electrode, first a boundary between the two different domains extends on or along a diagonal line as illustrated in FIG. 9. With time the boundary between the two different domains moves to approaches to a longitudinal center line of the rectangular-shaped opening. In this case, the boundary between the two different domains moves after the voltage application commenced, whilst the shielding layer is of course fixed. The movement of the boundary between the two different domains does make it impossible to shield, by a shielding layer fixed, the ray of whiteness light having transmitted through the boundary. Further, it takes 1 sec. in the order until the domains are stabilized and the boundary between them is fixed. During this, the boundary between the domains are kept to move and draw a white line as a residual image on the display.

Further, the Japanese laid-open patent application No. 63-106624 reduces a view angle dependency of the liquid crystal display by changing the directions of rubbing. As illustrated in FIG. 7, there are formed two different domains H and L on each of the substrates 23 and 33 by changing the directions of rubbing. As already described, the liquid crystal molecules adjacent to the substrate having already been subjected to rubbing are raised by a pretilted angle in the direction of rubbing. For this reason, the liquid crystals adjacent to the substrate having already been subjected to rubbing in different two directions as illustrated in FIG. 7 are raised by a pretilted angle in the different two directions of rubbing. The optical property of the display is symmetrical whereby the dependency of the visible property on the view angle is reduced.

Furthermore, the Japanese laid-open patent application No. 5-173135 forms four different domains within each pixel by moving one substrate in relation to another substrate so as to obtain symmetrical optical property as illustrated in FIG. 10.

The above conventional liquid crystal displays disclosed in the Japanese laid-open patent applications Nos. 63-106624 and 5-173135 have a disadvantage in needing to carry out rubbing in different directions for very small areas in each pixel. This requires an additional resist process and rubbing processes plural times. Further, it is required to carry out an alignment between top and bottom substrates at a high accuracy. Those result in increase of manufacturing cost of the liquid crystal display.

The Japanese laid-open patent application No. 6-194655 uses a chiral agent to cause a twist of 90 degrees of the liquid crystal molecules aligned between two substrates with orientation films subjected to no rubbing treatment as illustrated in FIG. 11. No rubbing treatment to the orientation films results in a week orientation force of liquid crystal molecules. The week orientation force of liquid crystal molecules allows a residual flow pattern formed in injection of the liquid crystal. The residual flow pattern of the liquid crystal prevents formation of the required orientations of the liquid crystal. In order to settle this problem, the substrates are subjected to a heat treatment so that liquid crystal is injected in isotropic phase and then cooled down to the room temperature. As a result, orientation vectors of the liquid crystal molecules continuously vary in direction over positions and the optical property of the display is symmetrical whereby the dependency of the visible property on the view angle is reduced.

Further, the Japanese laid-open patent application No. 7-92466 discloses use of a chiral agent and an orientation film of a pretilted angle of 0 degree in order to reduce a view angle dependency of the liquid crystal display by changing the directions of rubbing without conducting plural rubbing treatments as illustrated in FIGS. 12A and 12B.

The liquid crystal displays illustrated in FIGS. 7, 11 and 12A and 12B have a problem with the whiteness of the ray of light having transmitted through a boundary between different domains in which liquid crystal molecules have the same twist direction but different tilted-up directions as described above.

It was, as described above, proposed to provide an optical shielding layer for shielding the ray of light having transmitted through a boundary between different domains. However, the boundary between the different domains moves after the voltage application commenced until the different domains are stabilized as described with reference to FIG. 8.

Moreover, the optical shielding layer reduces an area of the screen of display whereby brightness of the screen is reduced.

Still more the Japanese laid-open patent application No. 6-242248 forms two different domains in which the liquid crystal molecules have different twist directions as illustrated in FIG. 13. Rubbing is made so that the liquid crystal molecules aligned between the substrates have a twist angle not less than 80 degrees but less than 90 degrees. The domains differs t from each other in rubbing direction so as to form different two domains in which the twist directions are different. As a result, the liquid crystal molecules adjacent to the substrate differ in tilted-up direction by 90 degrees between the different two domains. The optical property of the display is symmetrical whereby the dependency of the visible property on the view angle is reduced.

The above liquid crystal display has a problem with reduction in contrast between black and white colors. The liquid crystal molecules aligned between the substrates have a twist angle less than 90 degrees. This twist angle smaller than 90 degrees reduces the contrast between black and white colors.

Still further, the Japanese laid-open patent application No. 62-210423 provides an optical compensation plate having negative refractive index anisotropy between a liquid crystal cell and a polarizing plate. The optical compensation plate having anisotropic negative refractive index compensates double refraction due to a positive refractive index anisotropy of possessed by the liquid crystal molecules. In addition, it is disclosed in the Japanese laid-open patent applications Nos. 6-214116 and 7-20456 to use an optical compensation plate having an optical axis which is tilted from a vertical axis of the plate.

Actually, however, the use of the optical compensation plate improves but insufficiently the asymmetry of the optical property of the liquid crystal display.

It was therefore required to develop a novel liquid crystal display free from the above problems and disadvantages until the present invention was made, which will be described hereafter.

SUMMARY OF THE INVENTION

Accordingly, it is an object of the present invention to provide a novel liquid crystal display free from the problems and disadvantages as described above.

The above and other objects, features and advantages of the present invention will be apparent from the following descriptions.

The present invention provides a twisted nematic liquid crystal with a splay distortion for a liquid crystal display, wherein the twisted nematic liquid crystal includes a polymer at a content in the range of 0.5 wt % to 5.0 wt %.

The present invention also provides a nematic liquid crystal for a liquid crystal display, wherein domains which are different in tilted-up direction of liquid crystal molecules and uniform in twist direction of the liquid crystal molecules coexist.

The present invention also provides a nematic liquid crystal for a liquid crystal display, wherein domains of a first type which are different in tilted-up direction of liquid crystal molecules coexist as well as domains of a second type which are different in twist direction of liquid crystal molecules coexist.

The present invention also provides a nematic liquid crystal display which comprises a first substrate provided with a common electrode, a second substrate provided with a pixel electrode, the second substrate being arranged to extend in parallel to the first substrate, and a liquid crystal cell which includes a nematic liquid crystal with a splay distortion, wherein domains which are different in tilted-up direction of liquid crystal molecules and uniform in twist direction of the liquid crystal molecules coexist.

The present invention also provides a nematic liquid crystal display, which comprises a first substrate provided with a common electrode, a second substrate provided with a pixel electrode, the second substrate being arranged to extend in parallel to the first substrate, and a liquid crystal cell which includes a nematic liquid crystal with a splay distortion, wherein domains of a first type which are different in tilted-up direction of liquid crystal molecules coexist as well as domains of a second type which are different in twist direction of liquid crystal molecules coexist.

BRIEF DESCRIPTIONS OF THE DRAWINGS

Preferred embodiments of the present invention will be described with reference to the accompanying drawings.

FIG. 14 is a cross sectional elevation view illustrative of liquid crystal molecules, into which a small amount of polymer is dispersed, which are aligned between top and bottom substrates when no voltage is applied to the liquid crystal according to the present invention.

FIG. 15 is a cross sectional elevation view illustrative of liquid crystal molecules, into which a small amount of polymer is dispersed, which are aligned between top and bottom substrates when a voltage is applied to the liquid crystal according to the present invention.

FIG. 16 is a schematic view illustrative of different domains of two types which are different in tilted-up directions of liquid crystal molecules according to the present invention.

DISCLOSURE OF THE INVENTION

Figure 1:
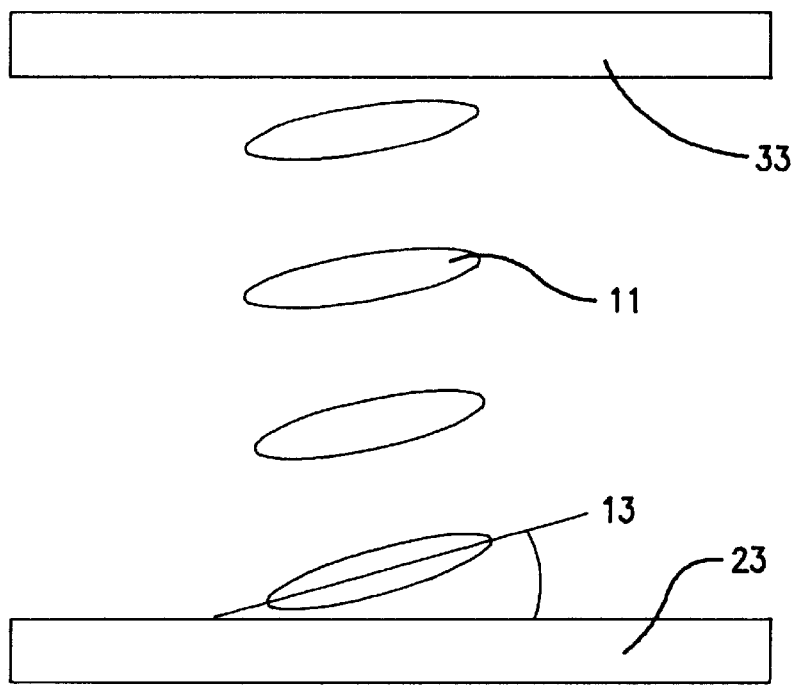
FIG. 1 is a cross sectional elevation view illustrative of liquid crystal molecules aligned between top and bottom substrates when no voltage is applied to the liquid crystal in the conventional liquid crystal display.
Figure 2:
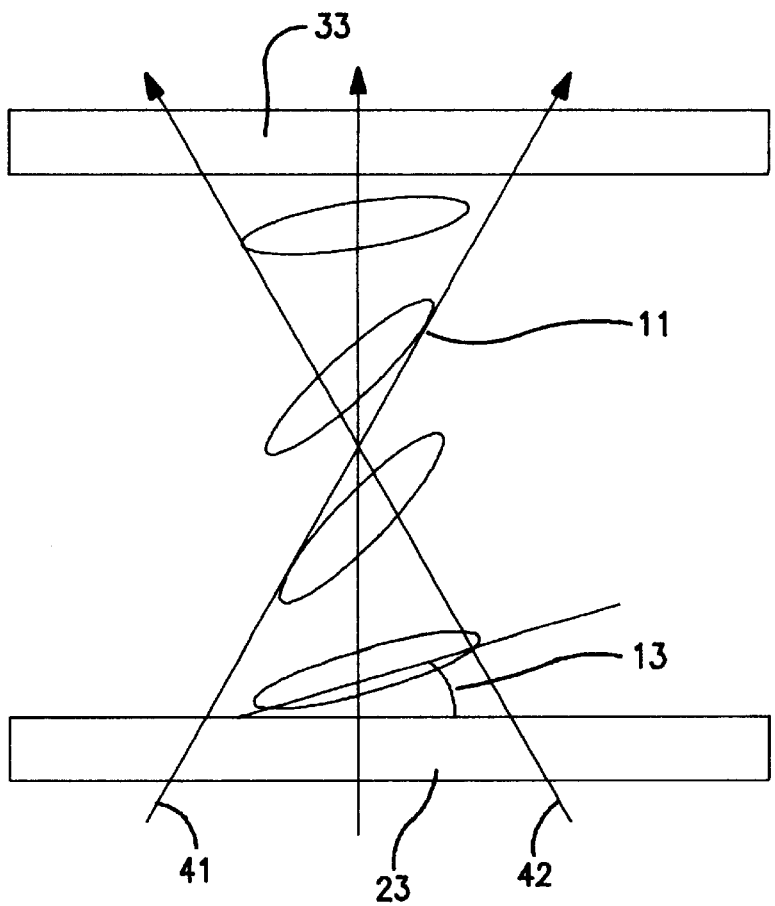
FIG. 2 is a cross sectional elevation view illustrative of liquid crystal molecules aligned between top and bottom substrates when a voltage is applied to the liquid crystal in the conventional liquid crystal display.
Figure 3:
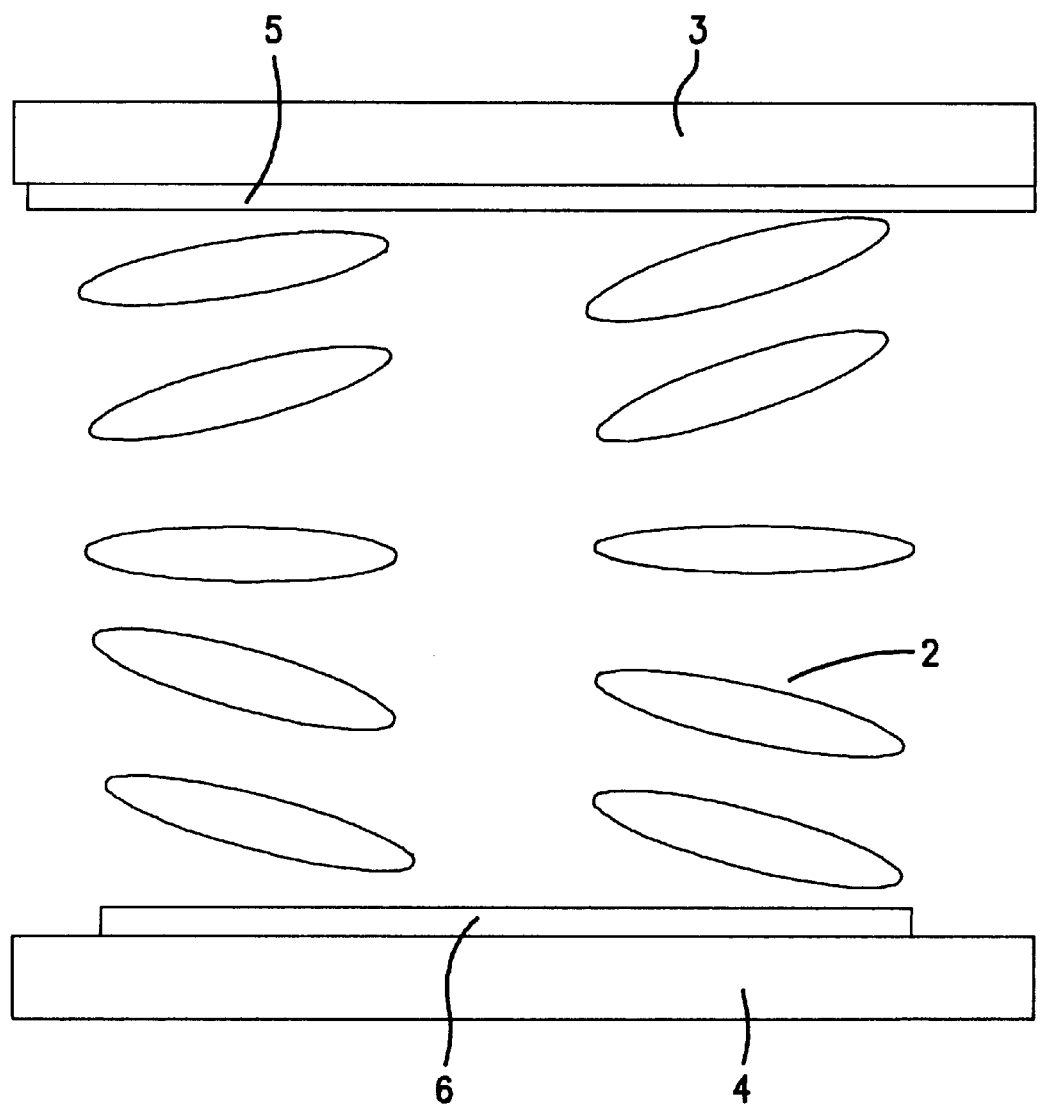
FIG. 3 is a cross sectional elevation view illustrative of liquid crystal molecules with a splay distortion, which are aligned between top and bottom substrates when no voltage is applied to the liquid crystal in the conventional liquid crystal display.
Figure 4:
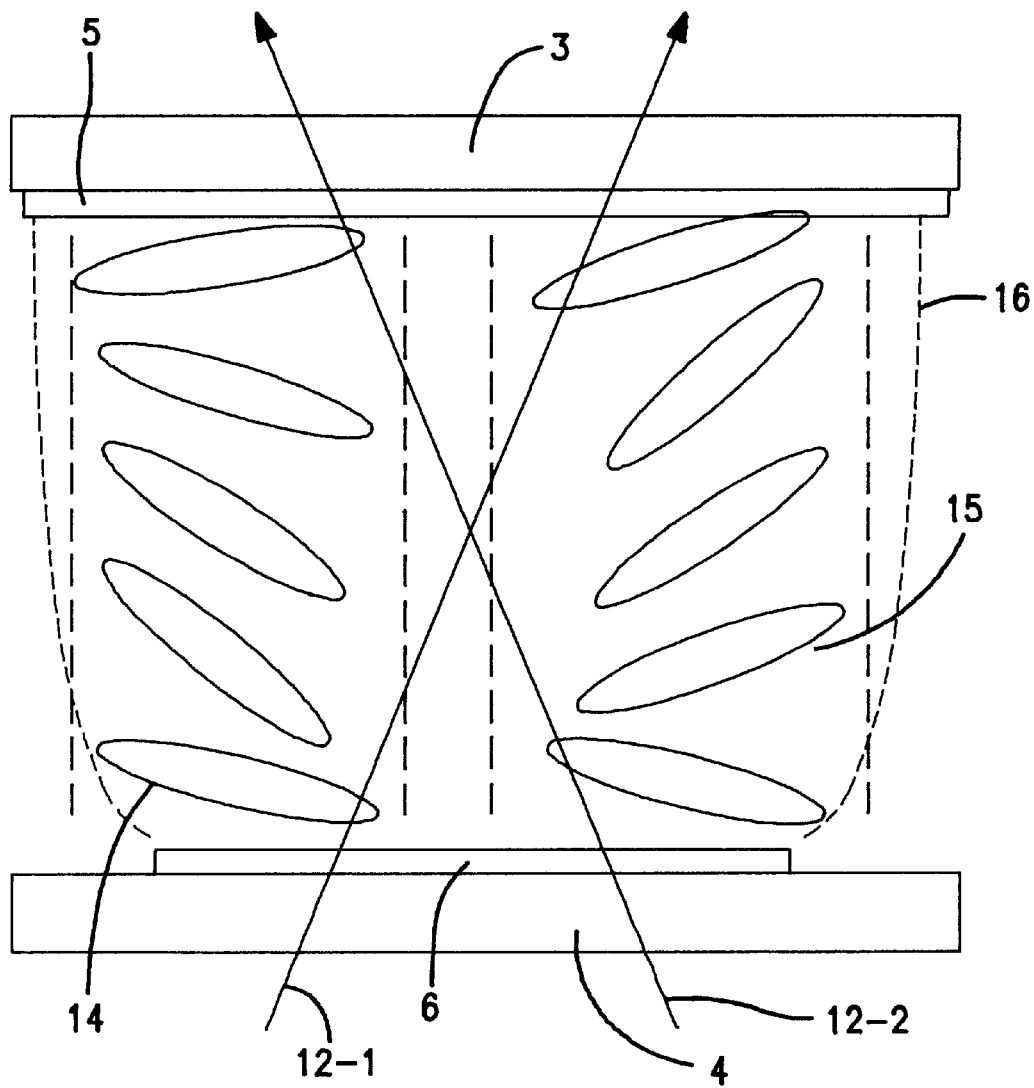
FIG. 4 is a cross sectional elevation view illustrative of liquid crystal molecules with a splay distortion, which are aligned between top and bottom substrates when a voltage is applied to the liquid crystal in the conventional liquid crystal display.
Figure 5:
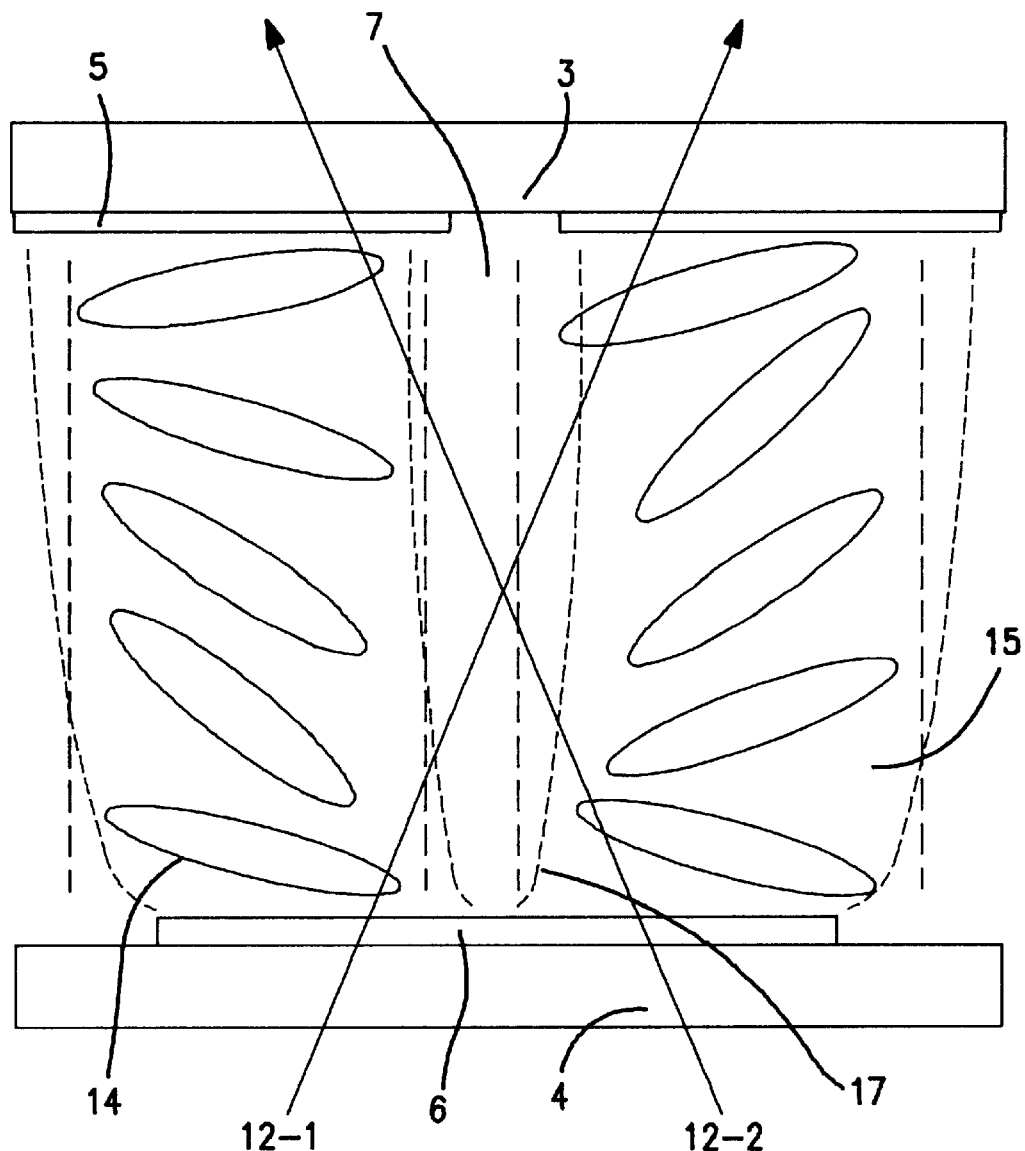
FIG. 5 is a cross sectional elevation view illustrative of liquid crystal molecules with a splay distortion, which are aligned between top and bottom substrates when a voltage is applied to the liquid crystal in the conventional liquid crystal display with a common electrode having an opening.
Figure 6:
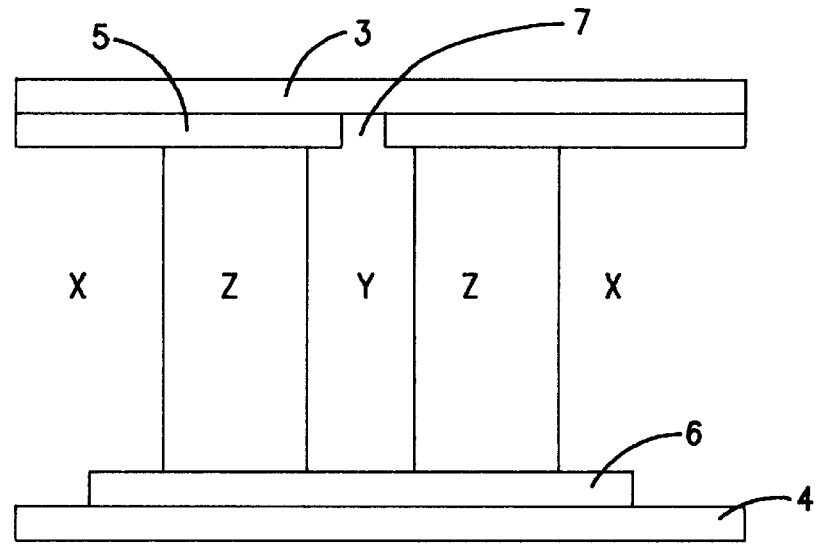
FIG. 6 is a cross sectional elevation view illustrative of a plurality of different domains of crystal liquid in the conventional liquid crystal display.
Figure 7:
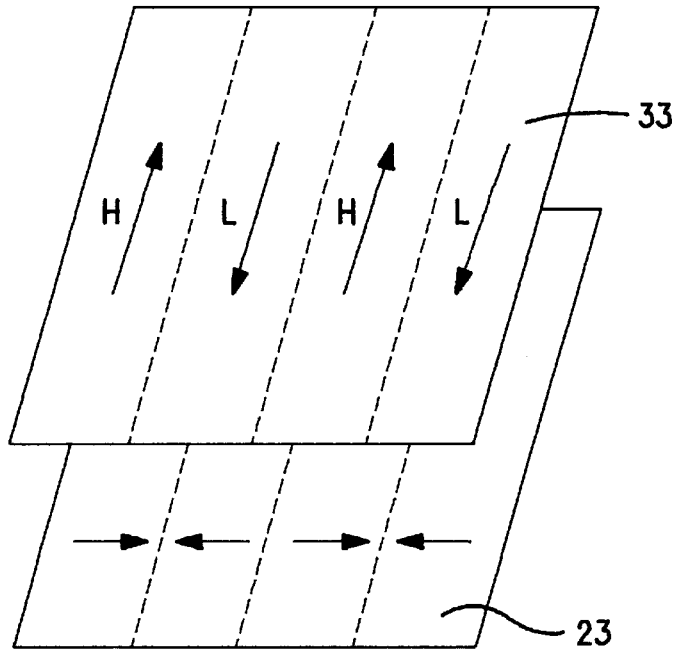
FIG. 7 is a view illustrative of rubbing treatments in different two directions for every domain.

The present invention provides a liquid crystal display using a twisted nematic liquid crystal with a splay distortion, wherein two substrates sandwiching the twisted nematic liquid crystal have been subjected to rubbing treatments so that the twisted nematic liquid crystal has a splay distortion as well as that the twisted nematic liquid crystal has a plurality of very small domains of at least two type. It is the essential feature for the present invention that a small amount of a polymer is dispersed into the twisted nematic liquid crystal so as to prevent any movement of boundaries between the very small domains. The polymer may be prepared by causing polymerization reaction of a small amount of either a monomer or an oligomer under a voltage application, wherein the small amount of monomer or oligomer has already been included in the liquid crystal before injection of the liquid crystal into a liquid crystal cell provided between substrates which have a common electrode and a pixel electrode respectively. As a result, the polymer was formed by the polymerization reaction of the monomer or oligomer and the boundaries between the different very small domains are fixed over positions. Thereafter, an optical shielding layer is provided to cover the boundaries between the different very small domains. Since the boundaries between the different very small domains have already been fixed over positions, the optical shielding layer is kept to cover the boundaries and thus shield a ray of light with whiteness transmitted through the boundaries where liquid crystal molecules are directed nearly parallel to surfaces of the substrates even if a voltage is applied to the liquid crystal.

The above matter will be described in more detail with reference to FIGS. 14 and 15. The liquid crystal molecules 2 with splay distortions are aligned between a pixel electrode 6 provided on a bottom substrate 4 and a common electrode 5 having an opening 7 provided on a top substrate 3. In the liquid crystal, a small amount of polymer 1 is dispersed in the form of a network. The top and bottom substrates have already been subjected to rubbing treatments so that the liquid crystal molecules 2 have splay distortions. The network of the dispersed polymer 1 is to loosely fix the liquid crystal molecules 2 over positions. Namely, the network of the dispersed polymer 1 has a roll-like cell membranes confining some of the liquid crystal molecules 2.

Figure 8:
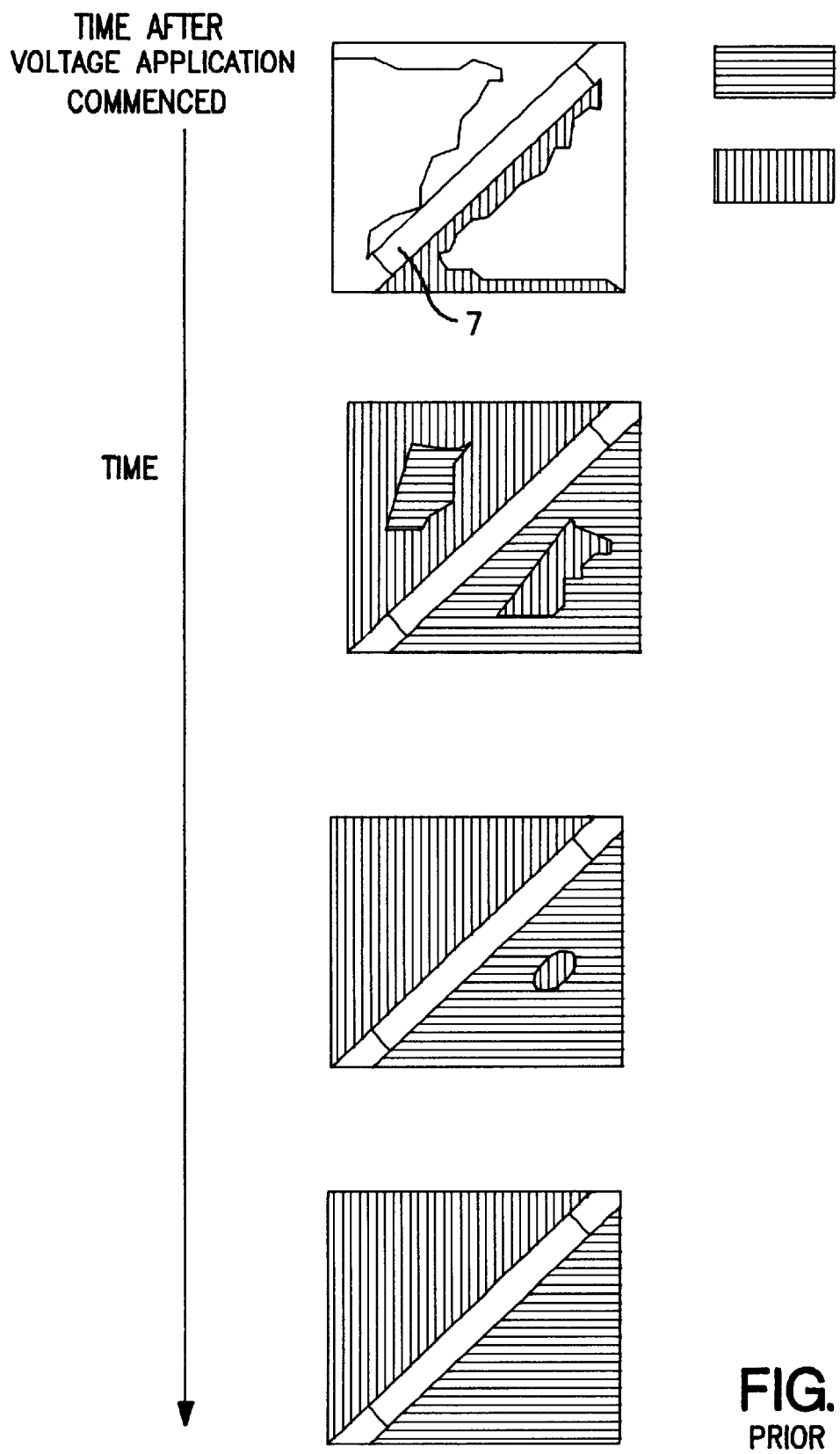
FIG. 8 is a view illustrative of variation with time in position of the boundary between different two domains in the conventional liquid crystal display.
Figure 9:
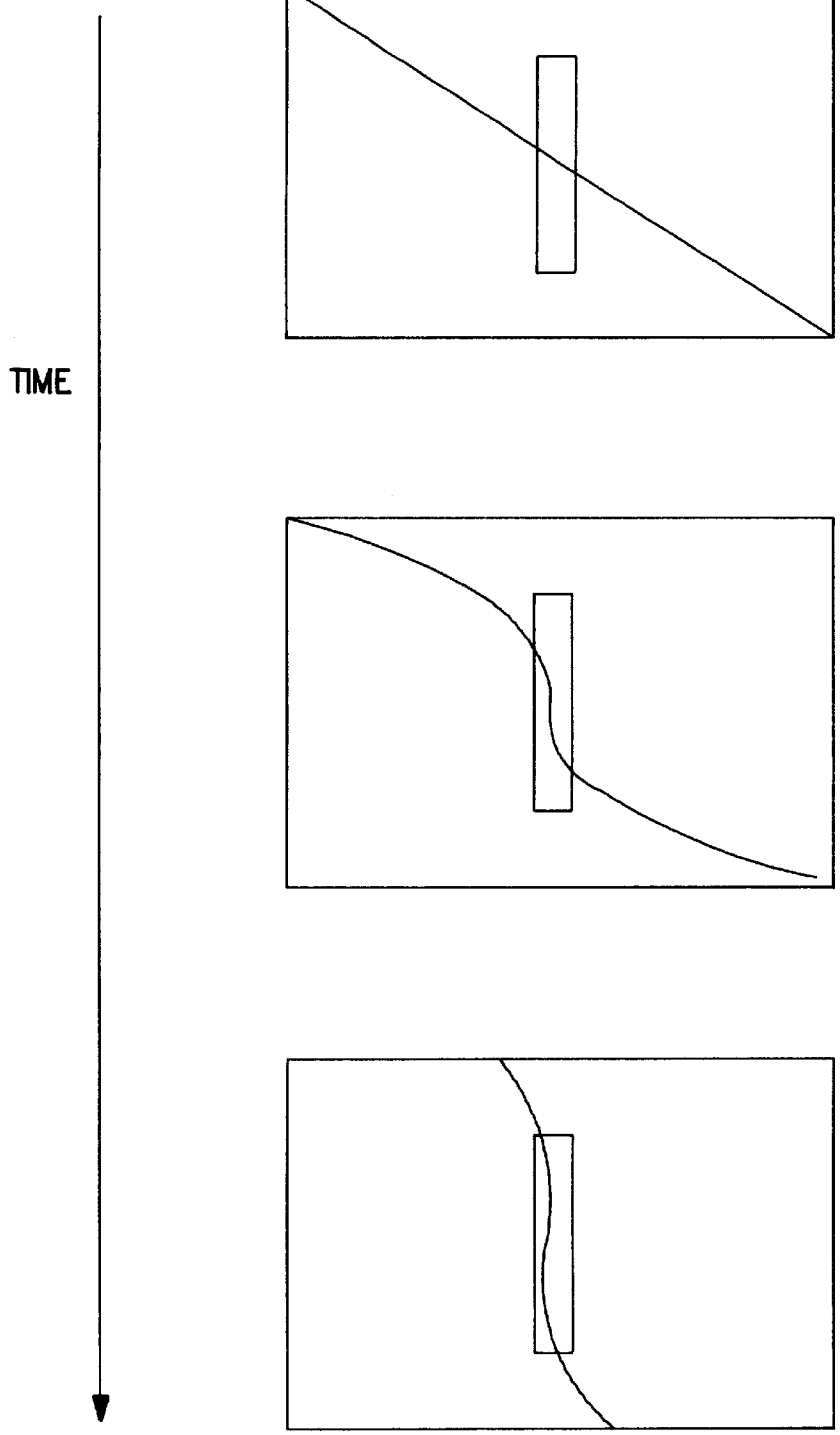
FIG. 9 is a view illustrative of variation with time in position of the boundary between different two domains in the conventional liquid crystal display.
Figure 10:
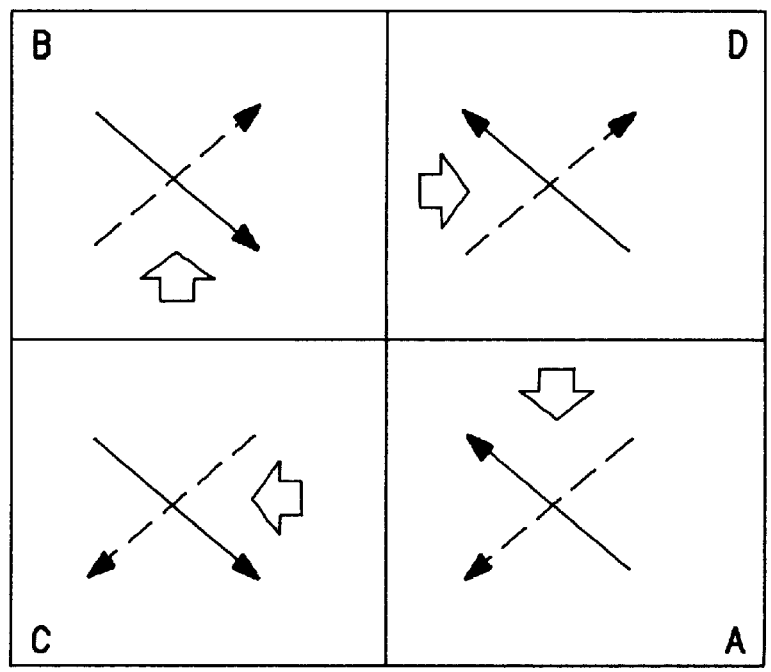
FIG. 10 is a view illustrative of rubbing treatments in different four directions for every domain.
Figure 11:
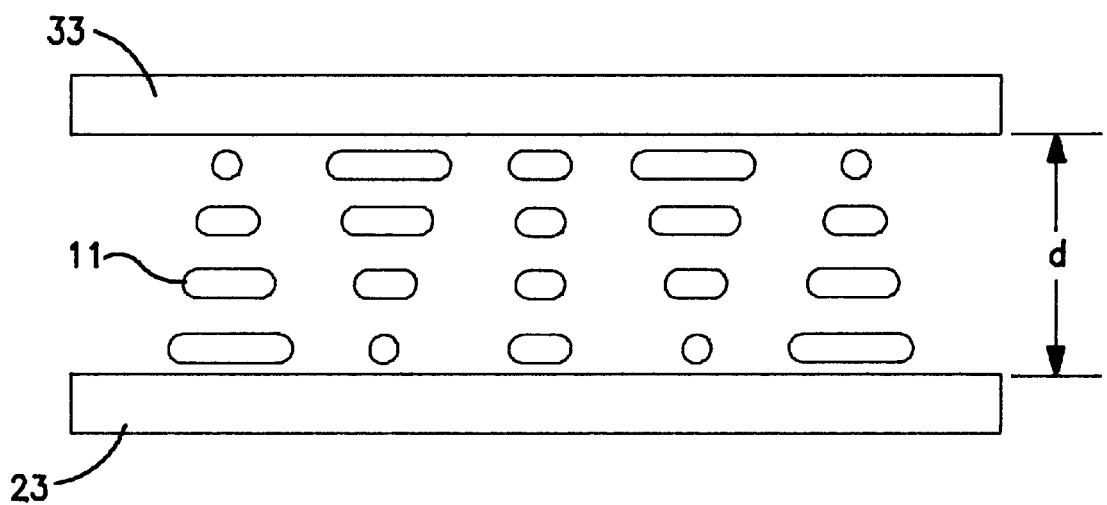
FIG. 11 is a cross sectional elevation view illustrative of liquid crystal molecules having a twist, which are aligned between top and bottom substrates when no voltage is applied to the liquid crystal in the conventional liquid crystal display.
Figure 12A:
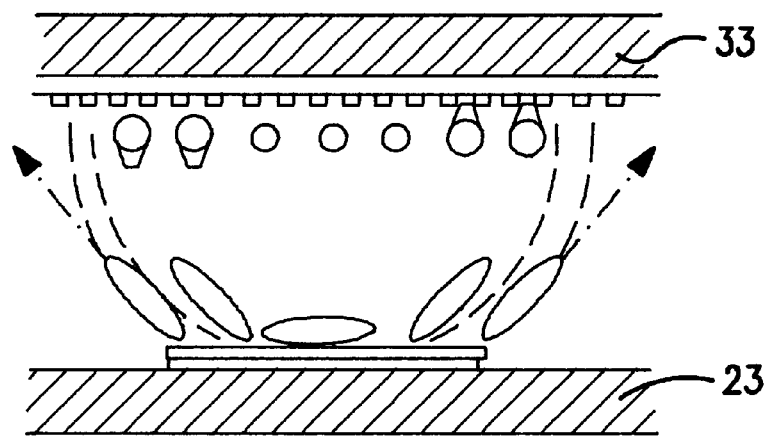
FIGS. 12A and 12B are a cross sectional elevation view and a plane view respectively illustrative of liquid crystal molecules having a twist, which include chiral agent and are aligned between top and bottom substrates when no voltage is applied to the liquid crystal in the conventional liquid crystal display.
Figure 12B:
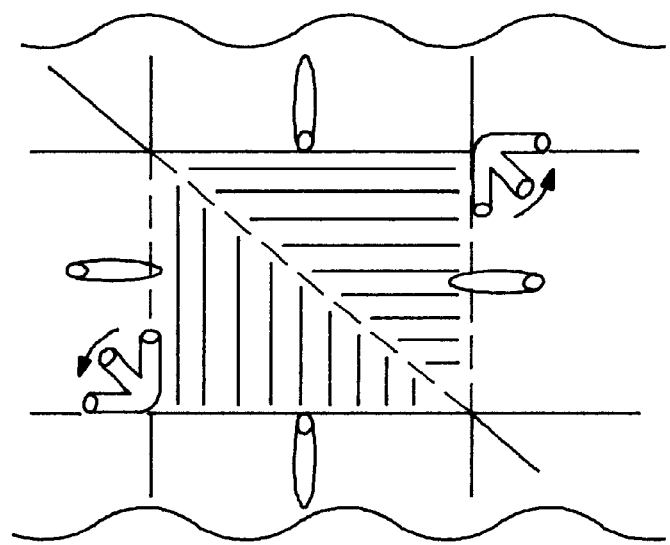
Figure 13:
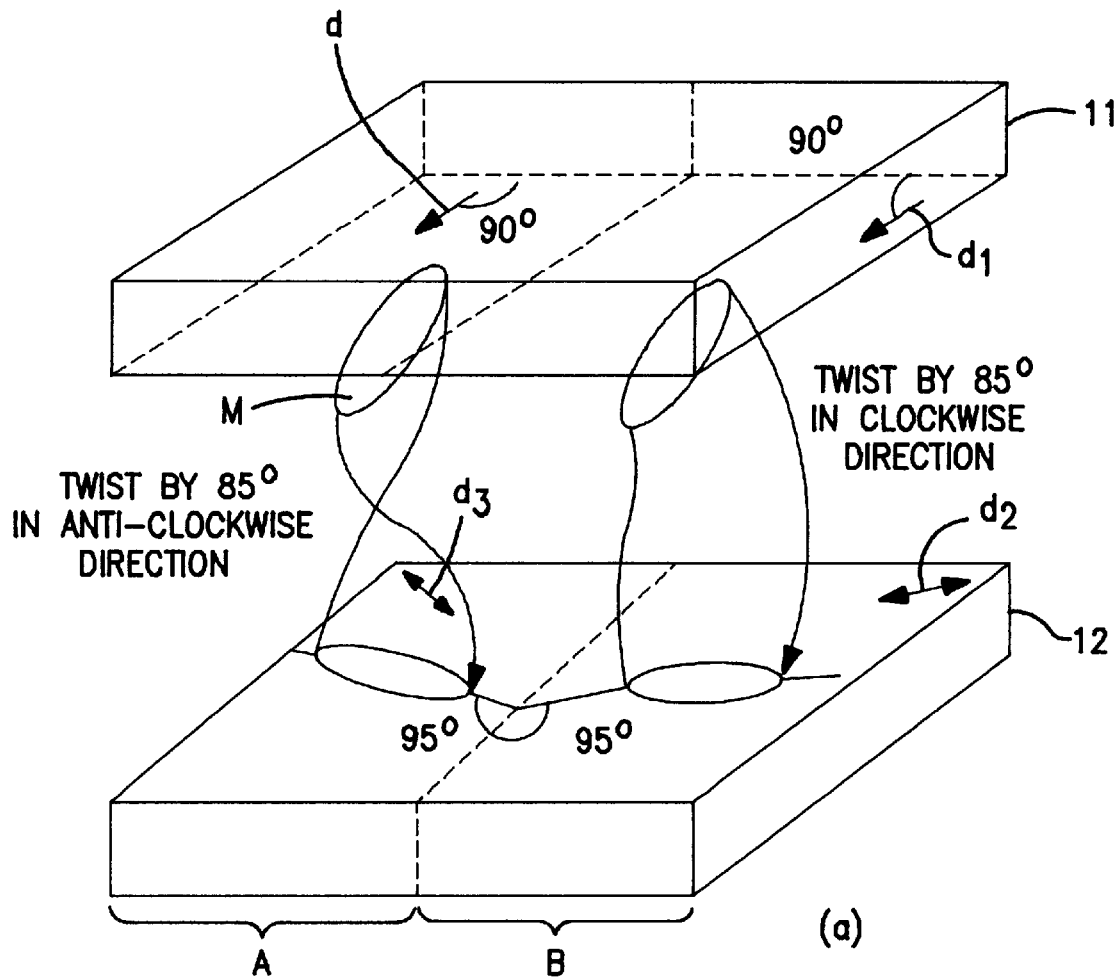
FIG. 13 is a schematic view illustrative of liquid crystal molecules with twists not more than 90 degrees in different directions in the conventional liquid crystal display.

When a voltage is applied to the liquid crystal, the liquid crystal molecules 2 are tilted up in different directions between a right half domain and a left half domain. After the voltage application commenced, the boundary between the different domains is fixed by the network of polymer 1 contrary to the movement thereof as illustrated in FIG. 8.

The rubbing treatment is carried out so that a liquid crystal will have a spray distortion upon no voltage application to the liquid crystal. A small amount of a monomer or an oligomer is added to the liquid crystal before the liquid crystal is injected into between the substrates having the common electrode and the pixel electrode. The polymerization reaction of monomer or oligomer forms a network of polymer which acts like cell membranes confining some of the liquid crystal molecules. As a result, the network of polymer prevents movement of the boundaries of the different domains which have liquid crystal molecules tilted-up in different directions. A monomer or oligomer may be dissolved into the liquid crystal. After the injection of the liquid crystal into which the monomer or oligomer has already been dissolved, a voltage sufficiently low for preventing any remarkable variation in initial permissivity of light is applied to the liquid crystal so as to control a timing of causing the polymerization reaction of monomer or oligomer whereby a network of polymer is formed in the liquid crystal. As a result, the liquid crystal molecules with pretilted angles are confined in the network of polymer.

As described above, an optical shielding layer may be provided which is aligned to the opening 7 provided in the common electrode 5 for shielding the ray of light with whiteness transmitted through the boundaries between the different domains. In this case, it may be a voltage sufficiently low for preventing any remarkable variation in initial permissivity of light may be applied to the liquid crystal to allow the boundaries to move, so that just when the boundaries are aligned to the opening 7, the polymerization reaction of monomer or oligomer is caused to forms a network of polymer which fixes the boundaries to be covered by the optical shielding layer. The ray of light with whiteness transmitted through the boundaries between the domains is well shielded by the optical shielding layer provided at the opening 7. As a result, a desirable high contrast image can be obtained.

The present invention described above may of course be applicable to the liquid crystal display having a common electrode free of an opening.

As described above, the monomer or oligomer has previously been dissolved in the liquid crystal before injection of the liquid crystal into the liquid crystal cell between the substrates. Thereafter, the polymerization reaction of monomer or oligomer forms a network of polymer in the liquid crystal.

Alternatively, the polymer may be is dissolved and dispersed in the liquid crystal before injection of the liquid crystal into the liquid crystal cell between the substrates.

The polymer used in the present invention may be one having a similar molecular structure to the liquid crystal molecules. Further, the polymer used in the present invention may be one having a flexibility such as having an alkylene chain since the polymer is not used to define an orientation of the liquid crystal molecules. In view of necessity of dissolving and dispersing polymer into the liquid crystal, it may be preferable that the polymer chain has a sufficient flexibility and a sufficient solubility to the liquid crystal.

As described above, the polymer is directly dissolved and dispersed into the liquid crystal. Notwithstanding, in view of the facilitation of injection of the liquid crystal as well as a stability of the initial orientation of the liquid crystal molecules, it may be preferable that monomer or oligomer is first dissolved in the liquid crystal for subsequent polymerization reaction thereof in the liquid crystal phase.

Photo-curing monomers, thermo-setting monomers and oligomers thereof may be used. In addition, any material but having a main component comprising either photo-curing monomers, thermo-setting monomers and oligomers thereof may be used. The photo-curing monomers and oligomers thereof include not only one responsive to visible rays of light but also one responsive to ultraviolet rays. In view of facilitation of operation, the latter may be more preferable. Mono-functional monomers and oligomers thereof, bifunctional monomers and oligomers thereof as well as trifunctional monomers and oligomers thereof may be used. In addition, multifunctional monomers and oligomers thereof may be used.

The ultraviolet-curing monomers include mono-functional acrylate compounds, mono-functional methacrylate compounds, multifunctional acrylate compounds, multifunctional methacrylate compounds, styrene, aminostyrene, vinyl acetate and others.

Mono-functional acrylate compounds may, for example, include 2-ethylhexylacrylate, butylethylacrylate, butoxyethylacrylate, 2-cyanoethylacrylate, benzylacrylate, cyclohexylacrylate, 2-hydroxypropyl aciylate, 2-ethoxyethylacrylate, N,N-diethylaminoethylacrylate, N,N-dimethylaminothylacrylate, dicyclopentanylacrylate, dicyclopentenylacrylate, gylcidylacrylate, tetrahydrofrufurylacrylate, isobornylacrylate, isodecylacrylate, laurylacrylate, morpholineacrylate, phenoxyethylacrylate, phenoxydiethyleneglycolacrylate, 2,2,2-trifluoroethylacrylate, 2,2,3,3,3-pentafluoropropylacrylate, 2,2,3,3-tetrafluoropropylacrylate, and 2,2,3,4,4,4-hexafluorobutylacrylate.

Mono-functional methacrylate compounds may, for example, include 2-ethylhexylmethacrylate, butylethylmethacrylate, butoxyethylmethacrylate, 2-cyanoethylmethacrylate, benzylmethacrylate, cyclohexylmethacrylate, 2-hydroxypropylmethacrylate, 2-etboxyethylmethacrylate, N,N-diethylaminoethylmethacrylate, N,N-dimethylaminothylmethacrylate, dicyclopentanylmethacrylate, dicyclopentenylmethacrylate, gylcidylmethacrylate, tetrahydrofrufuryhnethacrylate, isobornylmethacrylate, isodecylmethacrylate, laurylmethacrylate, morpholinemethacrylate, phenoxyethylmethacrylate, phenoxydiethyleneglycolmethacrylate, 2,2,2-trifluoroethylmethacrylate, 2,2,3,3,3-tetrafluoropropylmethacrylate, and 2,2,3,4,4,4-hexafluorobutylmethacrylate.

Mulifunctional acrylate compounds may, for example, include 4,4'-biphenyldiacrylate, diethylstilbestroldiacrylate, 1,4-bisacryloyloxybenxene, 4,4'-bisacryloyloxydiphenylether, 4,4'-bisacryloyloxydiphenylmethane, 3,9-bis-[1,1-dimethyl-2-acryloyloxyethyl]-2,4,8,10-tetraspiro[5,5]undecane, α,α'-bis-[4-acryloyloxyhenyl]-1,4-diisopropylbenzene, 1,4-bisacryloyloxytetrafluorobenzene, 4,4'-bisacryloyloxyoctafluorobiphenyl, diethyleneglycoldiacrylate, 1,4-butanedioldiacrylate, 1,3-butyleneglycoldiacrylate, dicyclopentanyldiacrylate, glyceroldiacrylate, 1,6-hexandioldiacrylate, neopentylglycoldiacrylate, tetraethyleneglycoldiacrylate, trimethylolpropanetriacrylate, pentaerythlytoltetraacrylate, pentaerythlytoltriacrylate, ditrimethylolpropanetetraacrylate, dipentaerythlytolhexaacrylate, dipentaerythlytolmonohydroxypentaacrylate, 4,4'-diacryloyloxystilbene, 4,4'-diacryloyloxydimethylstilbene, 4,4'-diacryloyloxydiethylstilbene, 4,4'-diacryloyloxydipropylstilbene, 4,4'- diacryloyloxydibutylstilbene, 4,4'-diacryloyloxydipentylstilbene, 4,4'-diacryloyloxydibexthylstilbene, 4,4'-diacryloyloxydifluorostilbene, 2,2,3,3,4,4-hexafluoropentanediol, 1,5-diacrylate, 1,1,2,2,3,3-hexafluoropropyl-1,3-diacrylate, and urethaneacrylate oligomer.

Multifunctional methacrylate compounds may, for example, include diethyleneglycoldimethacrylate, 1,4-butanedioldimethacrylate, 1,3-butyleneglycoldimethacrylate, dicyclopentanyldimethacrylateglyceroldimethacrylate, 1,6-hexanedioldimethacrylate, neopentylglycoldimethacrylate, tetraethyleneglycoldimethacrylate, trimethylolpropanetrimethacrylate, pentaerythlytoltetramethacrylate, pentaerythlytoltrimethacrylate, ditrimethylolpropanetetramethacrylate, dipentaerythlytolhexamethacrylate, dipentaerythlytolmonohydroxypentamethacrylate, 2,2,3,3,4,4-hexafluoropentanediol, 1,5-dimethacrylate, urethanemethacrylate oligomer and others.

A driving voltage for the liquid crystal display is influenced by an interaction on interface between polymer and liquid crystal. In view of this, the polymer used in the present invention may include fluorine atoms. The polymer may, for example, include 2,2,3,3,4,4-hexafluoropentadiol, 1,5-diacrylate, 1,1,2,2,3,3-hexafluoropropyl-1,3-diacrylate, 2,2,2-trifluoroethylacrylate, 2,2,3,3,3-pentafluoropropylacrylate, 2,2,3,3-tetrafluoropropylacrylate, 2,2,3,4,4,4-hexafluorobutylacrylate, 2,2,3,3-tetrafluoropropylmethacrylate, 2,2,4,4,4-hexafluorobutylmethacrylate, urethaneacrylate oligomer and others.

As described above, the photo-curing or ultraviolet-curing monomer may be used together with an initiator. Available initiators may be acetophenone system, benzoin system, benzophenone system, thioxanthone system, diazonum salt system, sulfonium salt system iodonium salt system and selenium salt system. Acetophenone system may, for example, include 2,2-diethoxyacetophenone, 2-hydroxy-2-methyl-1-phenyl-1-one. 1-(4-isopropylphenyl-)-2-hydroxy-2-methylpropane-1-one, 1-(4-dodecylphenyl-)2-hydroxy-2-methylpropane-1-one. Benzoin system may, for example, include benzoinmethylether, benzoinethylether, benzyldimethylketal and the other. Benzophenone system may, for example, include benzophenone, benzoyl benzonic acid, 4-phenylbenzophenone, 3,3-dimethyl-4-methoxybenzophenone and the others. Thioxanthone system may, for example, include thioxanthone, 2-chlorthioxanthone, 2-methylthioxanthone, and the others.

An addition of an extremely small mount of the polymer can obtain the effect for loosely fixing the liquid crystal molecules over positions. If the polymer is included at more than 5% by weight in the liquid crystal then the polymer may cause scattering of light and disturbance in orientation of the liquid crystal molecules. As a result, the contrast of image is lowered. If, however, the polymer is included at less than 0.5% by weight in the liquid crystal then the boundary between the domains can not be fixed over positions. Accordingly, it is preferable that an amount of the polymer included in the liquid crystal is not more than 5% by weight but not less than 0.5% by weight. Particularly, it is more preferable that the amount of the polymer included in the liquid crystal is approximately 2% by weight. The small amount of the polymer included in the liquid crystal may provide facilitation of mixing the polymer into the liquid crystal and a high freedom in combinations of polymers and liquid crystals, in addition facilitation of control of property of the liquid crystal display. The small amount of the polymer also suppresses an increase in viscosity of the liquid crystal having containing monomers or oligomers. This allows the use of normal injection technique for injecting the liquid crystal into the liquid crystal cell between substrates. This results in facilitation of manufacturing the liquid crystal display.

The present invention as described above is applicable not only to nematic liquid crystal including a small amount of chiral agent but also to nematic liquid crystal free of chiral agent.

If the liquid crystal display is driven by thin film transistors, it is required that the liquid crystal has a large electrical resistivity and a large retention of electric charge. It is therefore preferable that the liquid crystal is a material having a high electrical resistivity such as fluorine system and chlorine system, as well as showing no reduction of retention of electric charge even when exposed to visible rays of light or ultraviolet rays.

The optical shielding layer may be provided either on a substrate with the common electrode or on another substrate with the pixel electrode electrically connected o the thin film transistor. If the optical shielding layer is provided on the substrate with the common electrode, it is preferable that the optical shielding layer may comprise the same layer as a shielding layer for the thin film transistor. As a result, it is unnecessary to add an excess process for forming a color filtering substrate. In the latter case, the optical shielding layer may comprise the same layer as used in forming the thin film transistor to avoid complication of the process for forming the thin film transistor. For example, the optical shielding layer may, for example, comprise a part of a gate layer of the thin film transistor or a part of a drain layer thereof.

As described above, in accordance with the present invention, the polymer included at not more than 5% by weight but not less than 0.5% by weight in the liquid crystal does fix loosely the boundary between the domains. This provides the liquid crystal display with a high speed performance and a wide angle of visibility at a high contrast.

The present invention also provides a technique to form very small domains of two types without rubbing, wherein liquid crystal molecules are tilted-up in different directions for the two different domain types. The liquid crystal molecules differs in tilted-up direction between the different domains.

The present invention also provides a technique to form very small domains of four types without rubbing, wherein liquid crystal molecules are tilted-up in two different directions and twisted in two different directions for the four different domain types. The liquid crystal molecules differ both in tilted-up direction and in twisted direction among the four different domain types. A liquid crystal at a boundary between the different domains in which the liquid crystal molecules differ in twisted direction do show a different behavior from that of a liquid crystal at another boundary between the different domains in which the liquid crystal molecules differs in tilted-up direction.

The present invention also provides a technique to define a boundary between the different domains in which the liquid crystal molecules differ in twisted direction prior to defining another boundary between the different domains m which the liquid crystal molecules differ in tilted-up direction.

The present invention also provides a technique to fix the boundaries among the very small different domains of four types.

The present invention provides a liquid crystal display having two substrates sandwiching nematic liquid crystal which is divided into very small different domains of two types, wherein liquid crystal molecules differ in tilted-up direction between the different two types of domain. The very small different domains of two types are formed in random.

The present invention also provides a liquid crystal display having two substrates sandwiching nematic liquid crystal which is divided into very small different domains of four types, wherein liquid crystal molecules differ both in tilted-up direction and in twisted direction among the four different types of domain. The very small different domains of four types are formed in random. This situation may be regarded as that the domains different in the tilted-up direction and the domains different in the twist direction coexist. The boundary between the domains different only in the tilted-up direction comprises a plane which is vertical to the surfaces of the substrates. The above very small different domains of four types coexist in random but within each pixel.

It is preferable that a small amount of polymer is included in the liquid crystal to loosely fix the above domains.

In accordance with the present invention, a liquid crystal is first injected into between substrates. The liquid crystal injected has a temperature above a phase transition temperature between liquid phase and isotropic phase. The liquid crystal is then cooled down to a temperature below the phase transition temperature under a voltage application.

Further, a polymer is added into the liquid crystal. Alternatively, a monomer or an oligomer is added into the liquid crystal and then a polymerization reaction forms a polymer at a temperature over the phase transition temperature between liquid phase and isotropic phase.

The present invention also provides a driving method for driving a liquid crystal display, a voltage larger than a threshold voltage is applied even in a low level voltage application.

The present invention will be described in more detail with reference to the accompanying drawings.

FIG. 16 illustrates a twisted nematic liquid crystal layer within a single pixel, wherein twist of 90 degrees for liquid crystal molecules is not illustrated. The twisted nematic liquid crystal layer comprises a plurality of domains of two types. First is domain A and second is domain B. The twisted nematic liquid crystal molecules differ in tilted-up direction between the domains A and B. The domains A and B are formed in random but boundaries between the domains A and B comprise planes perpendicular to the surfaces of the liquid crystal layer. In accordance with the present invention, it is not intended to form regularly the domains A and B. Notwithstanding, it may be acceptable that a regular pattern of the domains A and B is formed accidentally.

Figure 17:
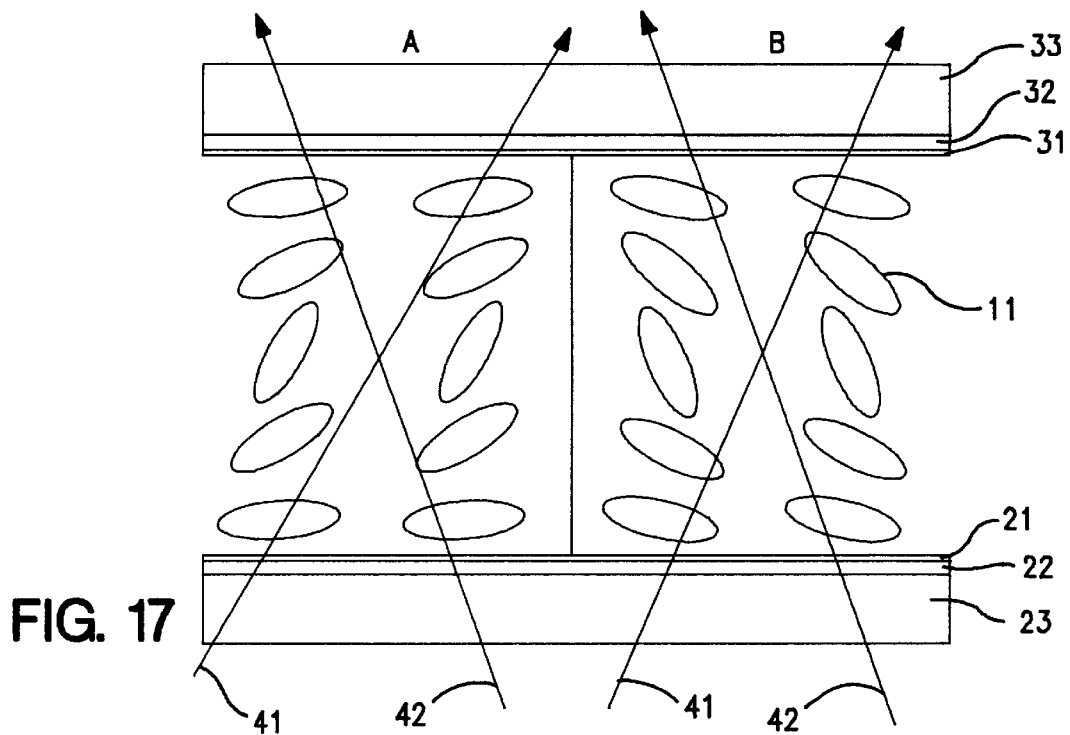
FIG. 17 is a cross sectional elevation view illustrative of different domains of two types which are different in tilted-up directions of liquid crystal molecules according to the present invention.

As illustrated in FIG. 17, the optical property of the liquid crystal are different between the domains A and B. The random pattern of the very small domains A and B in each pixel allows that the different optical property of the liquid crystal cancel each other. This reduces a view angle dependency of the optical property whereby a wide angle of visibility can be obtained.

Figure 18:
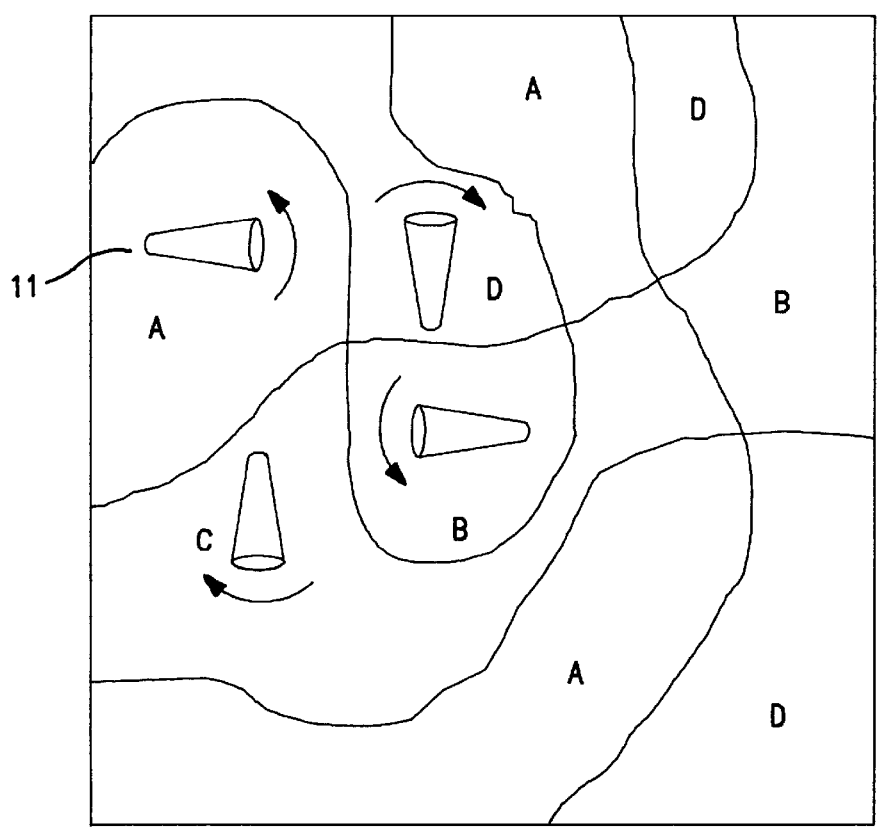
FIG. 18 is a plane view illustrative of coexistence of domains different in tilted-up directions of liquid crystal molecules and domains different in twisted directions of liquid crystal molecules.

FIG. 18 illustrates very small different domains of four types, domains A, B, C and D. The liquid crystal molecules differ both in tilted-up directions and in twist directions among the domains A, B, C and D. Cones represent the tilted-up direction of the liquid crystal molecule. The arrow marks represent the twist direction of the liquid crystal molecules. The tilted-up directions of the liquid crystal molecules differ by 90 degrees among the domains A, B, C and D respectively. The twist direction of the liquid crystal molecules in the domains A and B are the same anticlockwise direction. By contrast, the twist direction of the liquid crystal molecules in the domains C and D are the same clockwise direction. Such structure of the domains A, B, C and D provides symmetry to the optical property and reduces the view angle dependency of the optical property. As a result, a wide angle of visibility with no inversion of gray scale can be obtained.

It is preferable that the above domains A, B, C and D coexist within each pixel, but this is not essential condition although the domains A, B, C and D have to be very small.

It is further possible to form domains of different three types by adding a small among of chiral agent into the liquid crystal and subsequent cooling thereof under a voltage application.

Figure 19:
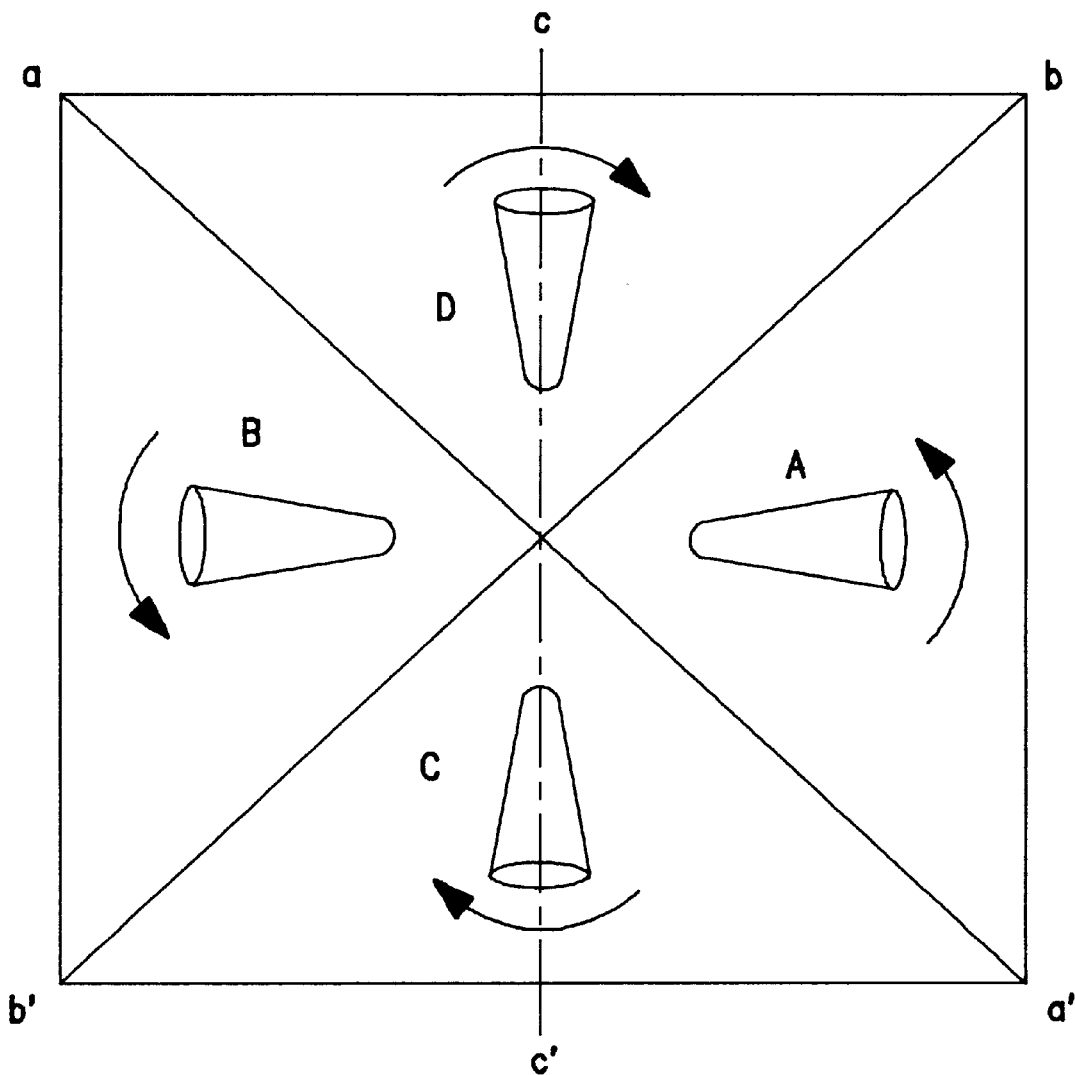
FIG. 19 is a plane view illustrative of domains A, B, C and D which differs both in tilted-up direction and in twisted direction of the liquid crystal molecules according to the present invention.
Figure 20:
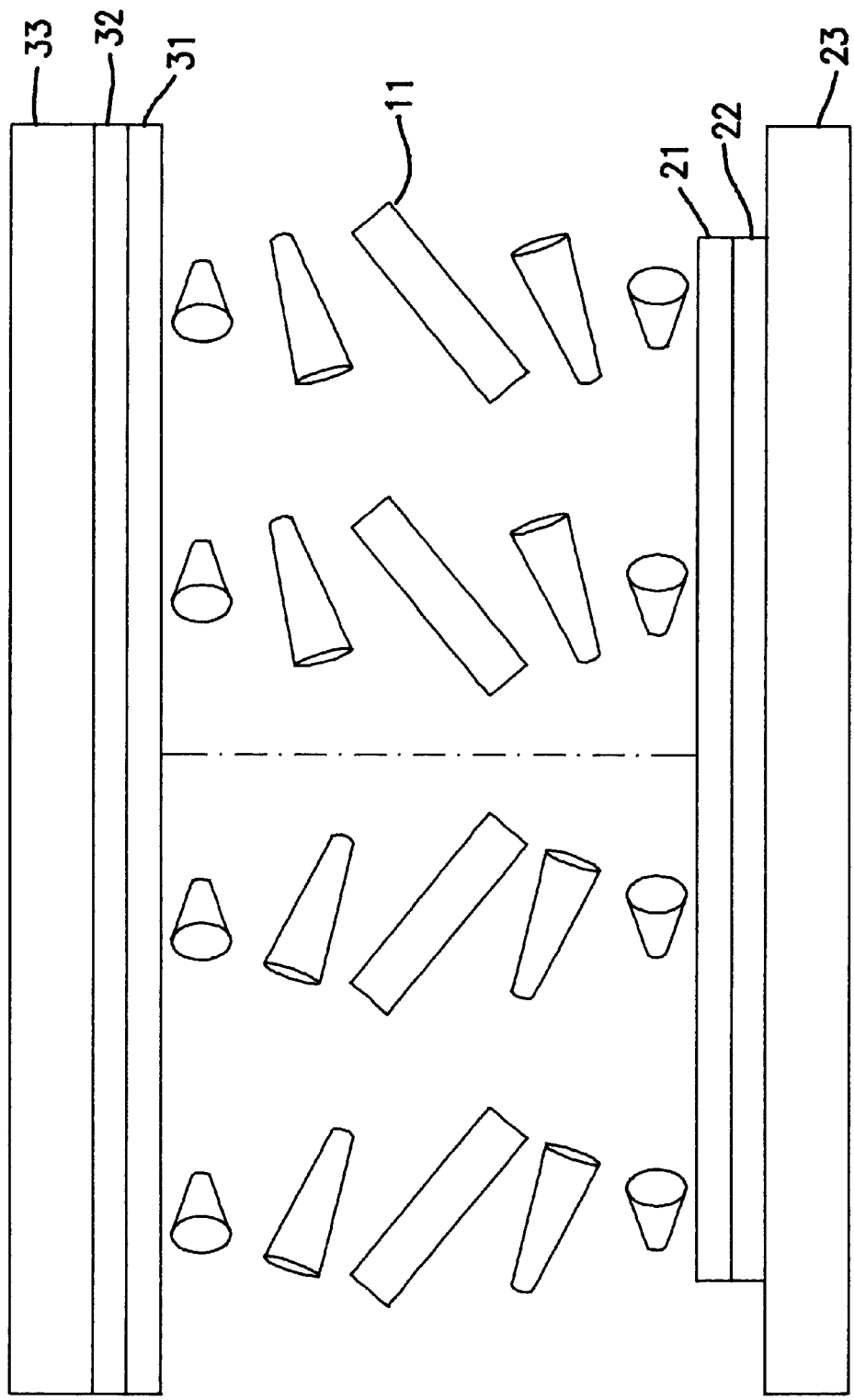
FIG. 20 is a cross sectional elevation view illustrative of domains A, B, C and D which differs both in tilted-up direction and in twisted direction of the liquid crystal molecules according to the present invention.

FIGS. 19 and 20 illustrate above domains A, B, C and D in which the liquid crystal molecules differ both in the tilted-up direction and in the twisted direction. The cones represent the tilted-up directions and the arrow marks represent the twisted directions. The tilted-up directions of the liquid crystal molecules differ by 90 degrees from each other among the domains A, B, C and D. The twist directions of the liquid crystal molecules are the same between the domains A and B and between the domains C and D, but different between the domains A, B and the domains C, D. This structure provide symmetry to the optical property and a reduced view angle dependency.

Although it is preferable that each pixel includes the domains A, B, C and D having almost the same area, it may be available that the domains A, B, C and D having different area, or each pixel includes only two or three kinds in the domains A, B, C and D. The boundaries among the domains A, B, C and D may be either a plane or a curved surface.

It is important for the present invention that the boundary between the domains different only in the tilted-up direction comprises either a plane perpendicular to the surfaces of the substrates or a curved surface perpendicular to the surfaces of the substrates.

The liquid crystal display described above has superior visible properties in normally white mode as well as has a high contrast. Such liquid crystal display can be achieved by the following orientation and use of the following materials.

In order to form the domains in random which are different in the tilted-up direction of the liquid crystal display, it is required that the liquid crystal molecules are tilted-up in the two different directions at almost the same probability. In order to cause that the liquid crystal molecules are tilted-up in the two different directions at almost the same probability, it is required that an orientation film is one which causes the liquid crystal molecules to have a small pretilted angle by a rubbing treatment When the normal orientation film is used, the direction of rubbing determines the direction toward which the liquid crystal molecules are tilted-up since the orientation film has a pretilted angle in the same direction as the rubbing. For this reason, it is difficult for the normal orientation film to certainly generate by one time rubbing the different domains of two types which differ in the tilted-up direction of the liquid crystal molecules.

By contrast, in accordance with the present invention, the orientation film causing the small pretilted angle of the liquid crystal molecules is used to certainly generate by one time rubbing the different domains of two types which differ in the tilted-up direction of the liquid crystal molecules or to certainly generate by one time rubbing the different domains of four types which differ both in the tilted-up direction and in the twisted direction of the liquid crystal molecules. For this reason, it is not necessary to carry out plural times the rubbing treatments and resist process. The single rubbing treatment can provide a sufficiently large orientation force for suppressing an orientation along the flow pass of the liquid crystal when injected. Thus, it is not necessary to heat up the substrates when injection of the liquid crystal thereinto. Namely, it is possible to inject the liquid crystal into between the substrates at the room temperature.

The orientation film having a small pretilted angle may, for example, be a polyimide film or a polystyrene film. The small pretilted angle provides a small difference in energy of liquid crystal molecules between the different pretilted directions. The small difference in energy of liquid crystal molecules between the different pretilted directions allows that the liquid crystal molecules are tilted-up in the two different directions at almost the same probability. For example, it is preferable that the pretilted angle is not more than 0.5 degrees. When a polymer film such as a polystyrene film is used as the orientation film, the polymer chains are directed vertical to the rubbing direction. For this reason, the liquid crystal molecules are oriented in a direction vertical to the rubbing direction. In such case, the pretilted direction is vertical to the rubbing direction. As a result, the pretilted angle is nearly equal to zero. The pretilted angle of the liquid crystal may be measured by a crystal rotation method.

Alternatively, in place of using the orientation film, a chiral agent may be used to cause that the liquid crystal molecules are tilted-up in the two different directions at almost the same probability.

In order to make the orientation, a polarization in a parallel direction to the surfaces of the substrates may be used or a formation of fine grooves parallel to the surfaces of the substrates may also be used, provided that the liquid crystal molecules are tilted-up in the two different directions at almost the same probability. Those methods are relatively easy to be carried out. For example, a linear polarization for orientation is disclosed in Japan journal of Applied Physics Vol. 31, 192 pp. 2155–2164 and Nature, Vol. 351 1991 pp. 49–50. In place of using the orientation film only, the orientation film may be applied for subsequent orientation treatment by a linear polarization before a liquid crystal monomer which shows a polymerization reaction when exposed to lights is applied and oriented in a direction vertical to the polarization direction prior to the polymerization reaction of the monomers by irradiation of lights to thereby form an orientation film. This method is disclosed in Liquid Crystal Vol. 18, 195, pp. 319–326.

Figure 21:
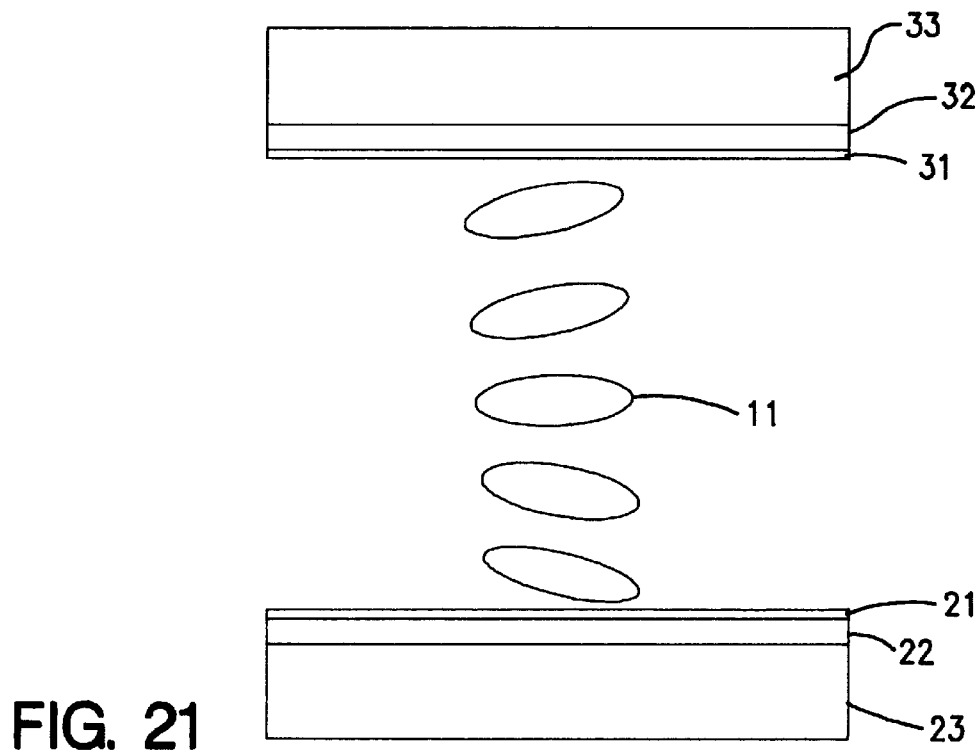
FIG. 21 is a cross sectional elevation view illustrative of the spray distortion of the liquid crystal molecules aligned between the substrates.

The above alternative method is to have the liquid crystal include a chiral agent with such a twist direction that the liquid crystal has a splay distortion as illustrated in FIG. 21. When using the orientation film having a small pretilted angle, the spray orientation slightly differs from the normal tilted orientation. The spray orientation of the liquid crystal ensures that the liquid crystal molecules are tilted-up in the two different directions at almost the same probability.

Figure 22:
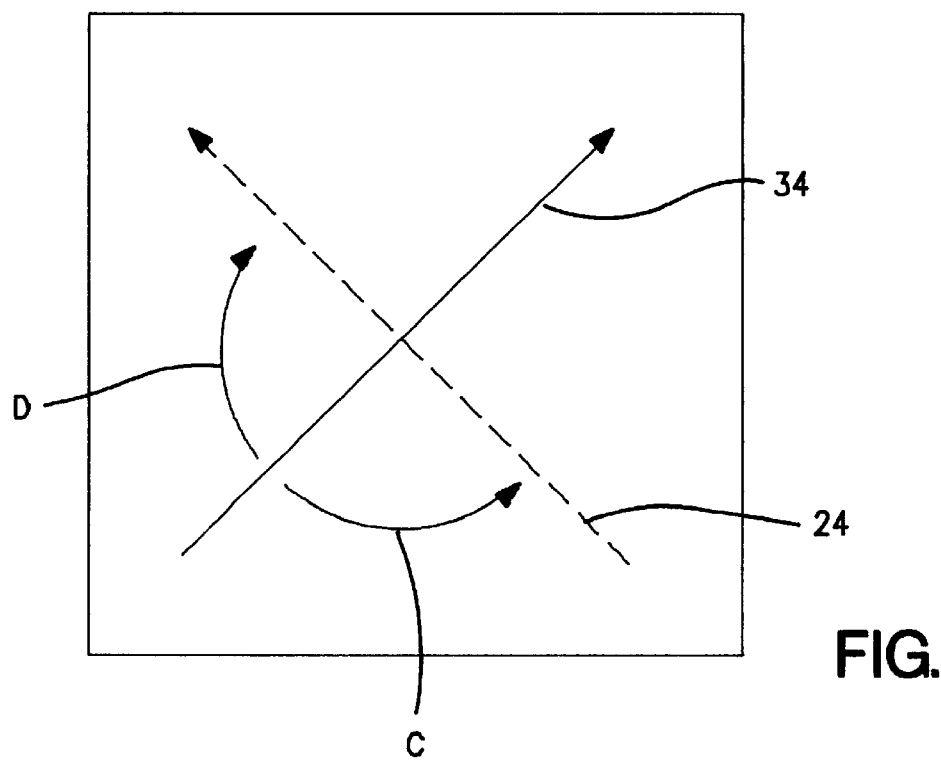
FIG. 22 is a view illustrative of a relationship between the rubbing direction and the orientation of the liquid crystal molecules.

FIG. 22 illustrates the relationship between the rubbing direction and the orientation of the liquid crystal molecules. An arrow mark 24 represents the rubbing direction of the top substrate. An arrow mark 34 represents the rubbing direction of the bottom substrate. An arrow mark C represents the spray orientation. An arrow mark D represents the normal tilted orientation. When an orientation film is used which orients the liquid crystal molecules in a direction perpendicular to the rubbing direction, then the liquid crystal molecules are theoretically pretilted in random directions but not in a certain direction. Actually, however, it may not be caused that the two domains different in the tilted-up direction of the liquid crystal molecules are uniformly formed for each the twisted directions. In order to obtain a stability of the domains, a chiral agent may be added to provide such a twist angle that the two domains different in the tilted-up direction of the liquid crystal molecules are uniformly formed for each the twisted directions.

The twist property of the liquid crystal is important for the present invention. The twist direction can freely be controlled by adding a chiral agent.

By adding a chiral agent, the liquid crystal molecules have a spray orientation whereby two domains are formed which are different only in the tilted-up direction. When the orientation film having a small pretilted angle is used to control the twist direction uniformly, then two domains are also formed which are different only in the tilted-up direction.

On the other hand, when no chiral agent or an extremely small amount of chiral agent is used, then different four domains are formed which are different both in the tilted-up direction and in the twist direction of the liquid crystal molecules. The domains different in the twist direction are generated at almost the same probability. For this reason, the domains of four types different both in the tilted-up direction and in the twist direction of the liquid crystal molecules are formed at almost the same probability. Since a chiral agent is not added, there is no need to increase the driving voltage.

Figure 23A:
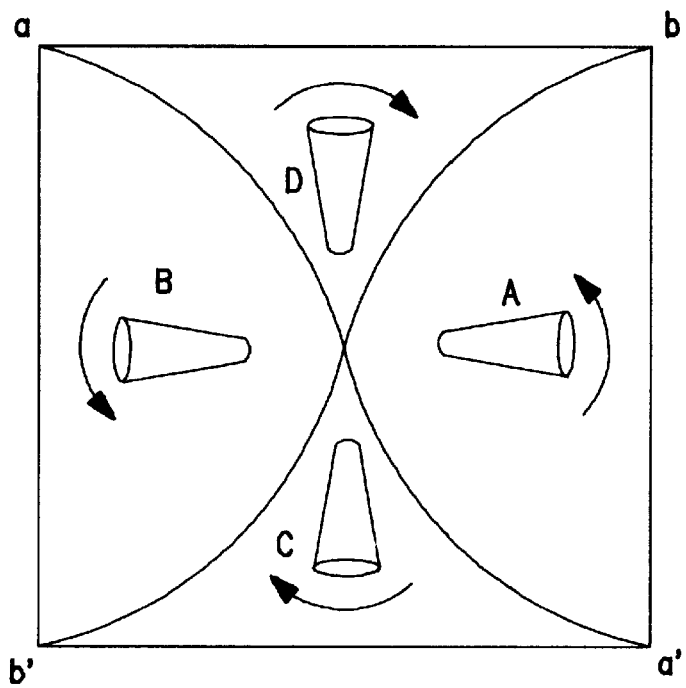
FIG. 23A is a domains A, B, C and D which differs both in tilted-up direction and in twisted direction of the liquid crystal molecules according to the present invention.
Figure 23B:
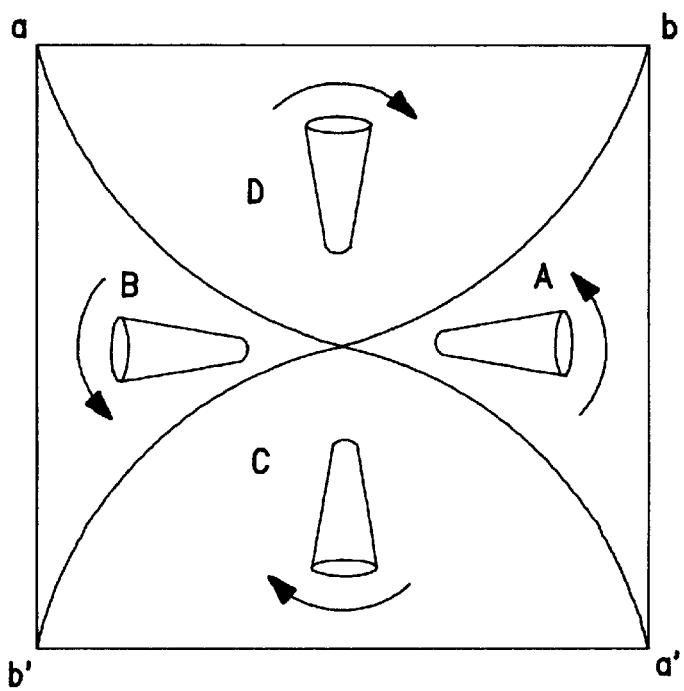
FIG. 23B is a domains A, B, C and D which differs both in tilted-up direction and in twisted direction of the liquid crystal molecules according to the present invention.

When an extremely small amount of the chiral agent is added to the liquid crystal, then the domains of four types different both in the tilted-up direction and in the twist direction of the liquid crystal molecules are formed at different probabilities. Namely, the domains of four types differ in area. The ratio in area of the domains of four types may be controlled by adding the chiral agent into the liquid crystal. This mans that by adding the chiral agent it is available to control the areas of the domains of four types as illustrated in FIGS. 23A and 23B to match the various requirements for obtaining vertically or horizontally wide angle of visibility. It is possible to avoid that the domains having different tilted-up directions but the same twist direction are in contact with each other to thereby obtain a high contrast image of the display.

By use of the above technique, it is possible to obtain a random formation of the domains of four types different in the tilted-up direction and in the twist direction.

Figure 24:
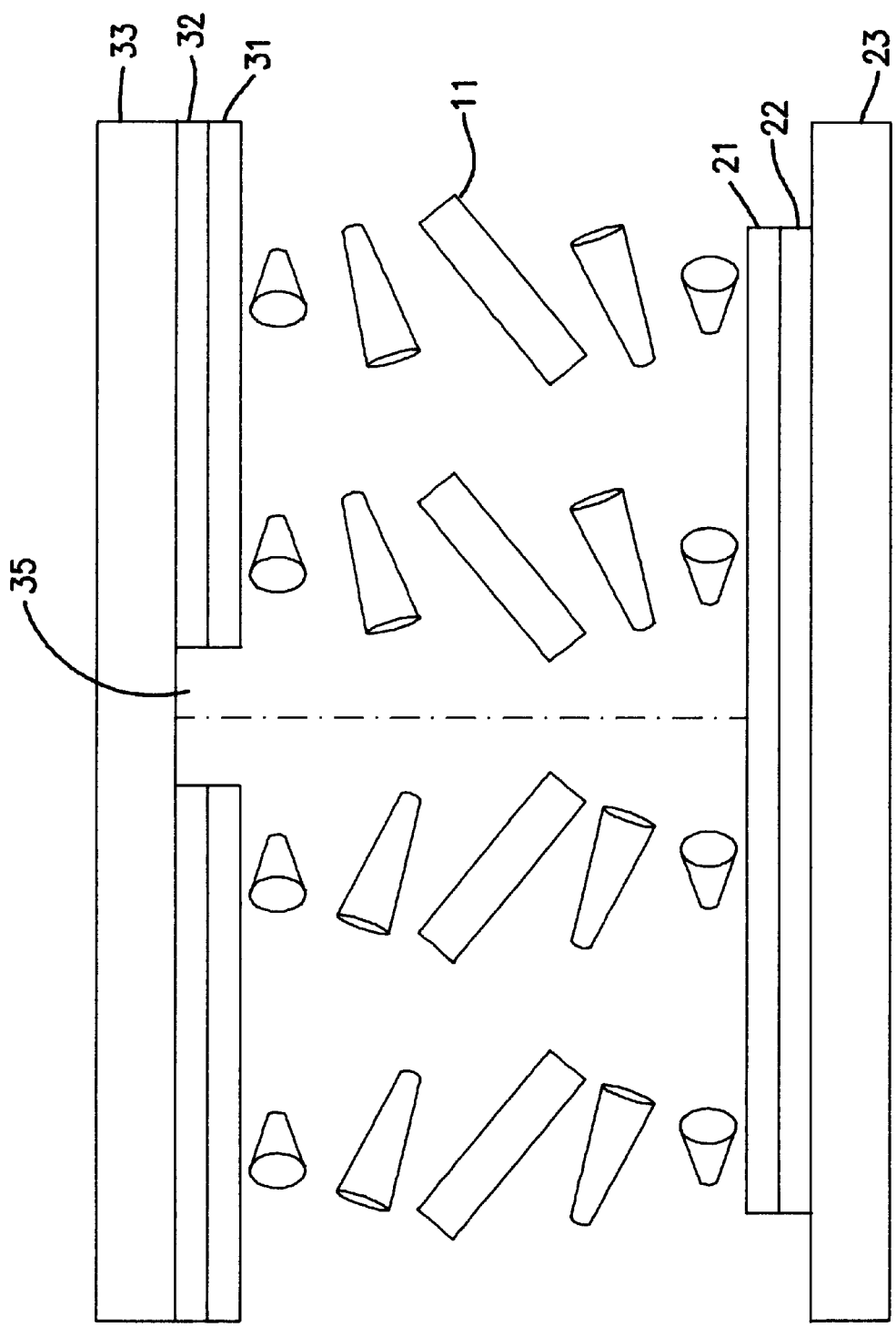
FIG. 24 is a cross sectional elevation view illustrative of liquid crystal molecules within domains different in tilted-up direction according to the present invention.

If it is required to form the domains of four types having specific shapes or areas, a non-uniform electric field may be applied to the liquid crystal. As illustrated in FIG. 20, the electrode provided on the top substrate may differ in area or shape from the electrode provided on the bottom substrate to obtain non-uniform electric field. Alternatively, an opening may be provided on one of the electrodes to obtain a non-uniform electric field as illustrated in FIG. 24. The opening may have various shapes. When the thin film transistor is provided on the substrate, then this substrate differs in area and in shape from another substrate provided with a common electrode. This can provide the non-uniform electric field.

In view of formation of the domains of four types, a constant direct-current voltage or an alternating-current voltage with a sufficiently high frequency may be applied to cause the liquid crystal molecules to show no response thereto. Notwithstanding, it is preferable to apply the voltages with a triangular or rectangular waveform or a sine waveform if it is required to avoid that the domains different in the tilted-up direction but the same twist direction are not in contact with each other as illustrated in FIGS. 23A and 23B.

It is important for the present invention that the domains different in the tilted-up direction but the same twist direction are not in contact with each other near the surface as illustrated in FIGS. 23A and 23B. This structure provides a wide angle of visibility and an excellent optical property in a wide view angle range. Even in the normally-white mode, it is not necessary to provide a shielding layer for obtaining a high contrast image. When the boundaries among the domains of four types are formed to be complicated, it is difficult to provide shielding layers to cover the boundaries.

Figure 25A:
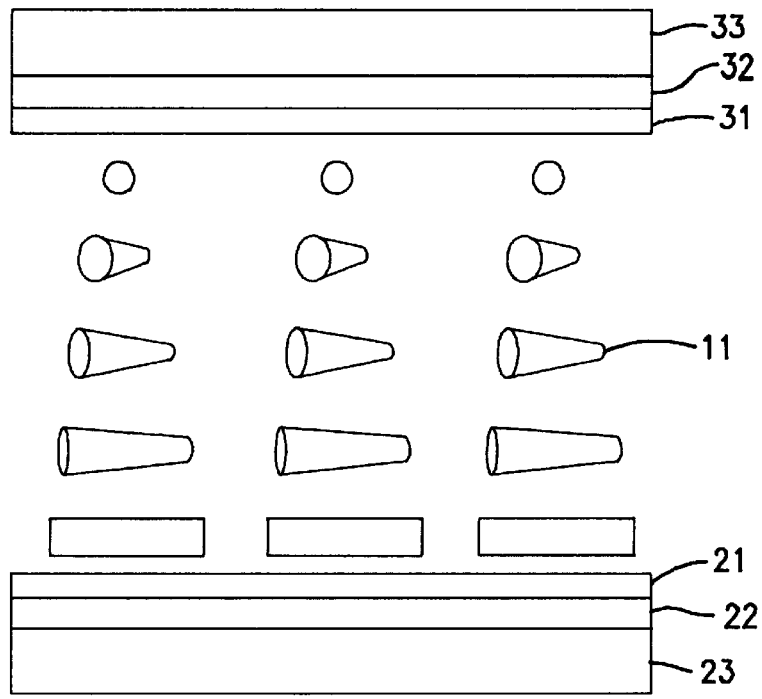
FIG. 25A is a cross sectional elevation view illustrative of liquid crystal molecules within domains different in tilted-up direction but the same twist direction when no voltage is applied.
Figure 25B:
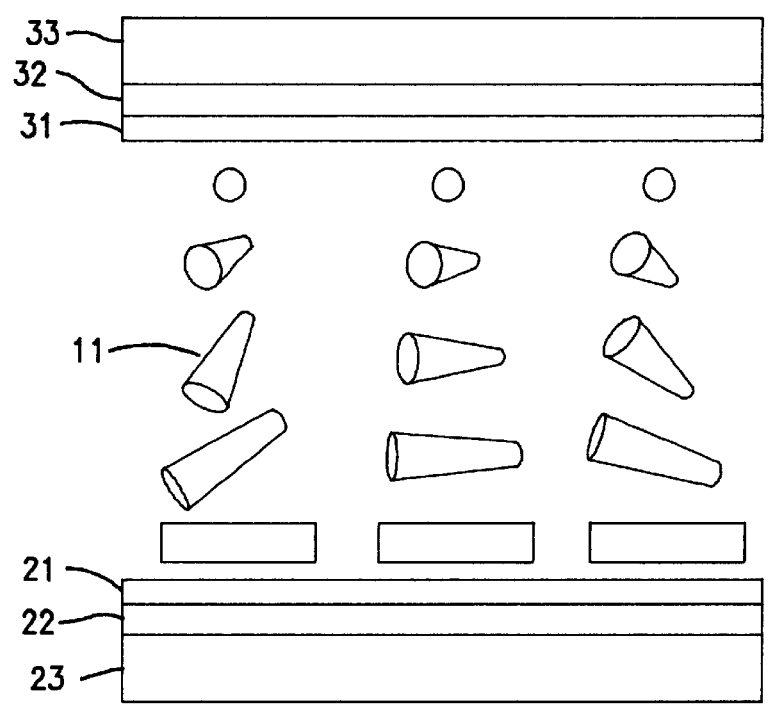
FIG. 25B is a cross sectional elevation view illustrative of liquid crystal molecules within domains different in tilted-up direction but the same twist direction when a voltage is applied.
Figure 26A:
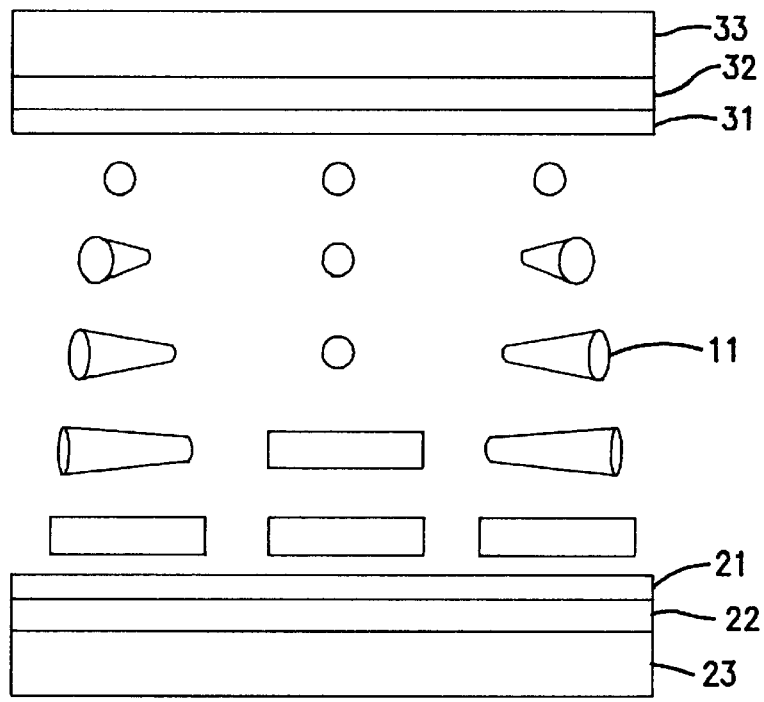
FIG. 26A is a cross sectional elevation view illustrative of liquid crystal molecules within domains different in tilted-up direction and in twist direction when no voltage is applied.
Figure 26B:
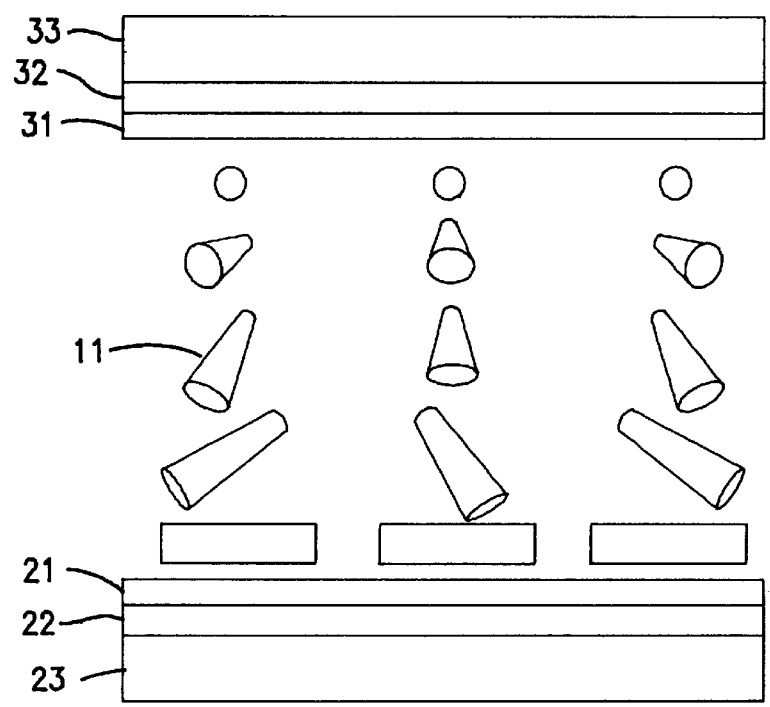
FIG. 26B is a cross sectional elevation view illustrative of liquid crystal molecules within domains different in tilted-up direction and in twist direction when a voltage is applied.

The reason why the above structure of liquid crystal domains can provide a high contrast will be described with reference to FIGS. 25A, 25B, 26A and 26B. FIGS. 25A and 25B illustrate two domains having the same twist direction and different tilted-up directions when no voltage is applied and when a voltage is applied respectively. FIGS. 26A and 26B illustrate two domains that differ in twist direction and in tilted-up direction when no voltage is applied and when a voltage is applied respectively. From FIGS. 25A and 25B, even if the voltage is applied to the liquid crystal, the liquid crystal at the boundary between the two domains different in the tilted-up direction but the same twist direction remains directed in parallel to the surfaces of the substrates. The ray of light being transmitting through the boundary between the two domains has a whiteness component by scattering of light even when the voltage is applied to the liquid crystal. This causes that the color of the pixel becomes somewhat white whereby the contrast between black and white is reduced.

By contrast, in FIGS. 26A and 26B, when the voltage is applied to the liquid crystal, the liquid crystal at the boundary between the two domains different in the tilted-up direction but the same twist direction are tilted-up nearly to the vertical direction to the surfaces of the substrates. The ray of light being transmitting through the boundary between the two domains has no whiteness component without scattering of light when the voltage is applied to the liquid crystal. This causes that the color of the pixel becomes black whereby the contrast between black and white is improved.

The above structure of the domains of four types, wherein the domains different in the tilted-up direction but the same twist direction are not in contact with each other by surface, can provide the following advantages. Since there are domains different in twist direction of the liquid crystal molecules, the domains are very small and the domains different in twist direction are alternately positioned. This means that the domains different in the tilted-up direction but the same twist direction are not in contact with each other near the surface. When the voltage is applied to the liquid crystal, the liquid crystal molecules aligned at the boundary between the domains different in the tilted-up direction but the same twist direction are largely tilted-up nearly to the vertical direction to the surfaces of the substrates. This liquid crystal orientations allow transmission of light without scattering. For this reason, the color of the ray of light transmitted through the boundary between the domains is black. Namely, the above liquid crystal domain structure is free from the problems with the reduction in contrast between the white and black due to the whitening of the ray of light having transmitted through the boundary.

The reason why the domains are formed which are different in the tilted-up direction but the same twist direction will be described. The liquid crystal at the boundary between domains different either in the tilted-up direction and in the twist direction are oriented with a distortion or a strain. The liquid crystal molecules at the boundary has a higher energy by a strain energy than the liquid crystal within the domains. The strains of the liquid crystal molecules differ between at the boundary between the domains different in the tilted-up direction and at the boundary between the domains different in the twist direction. If an energy of strain of the liquid crystal molecules at the boundary between the domains different in the tilted-up direction is higher than an energy of strain of the liquid crystal molecules at the boundary between the domains different in the twisted direction, then the domains different in the twist direction may be formed prior to the formation of the domains different in the tilted-up direction.

In order to form the very small domains of four types which are different both in the tilted-up direction and in the twist direction at the uniform probability, it is preferable that the liquid crystal is once heated up until the liquid crystal becomes in the isotropic phase for subsequent cooling down under voltage application to a temperature below the transition temperature between the liquid crystal phase and the isotropic phase. From the isotropic phase, a large number of liquid crystal drops are generated. As a result, the domains of four types are formed, which differ both in the tilted-up direction and in the twist direction. It is important that the cooling process is carried out under the voltage application so that the domains different in the tilted-up direction but the same twist direction are formed not in contact with each other by surfaces.

As illustrated in FIG. 25A, in the domains having the same twist direction of the liquid crystal molecules under no voltage application, the liquid crystal molecules have a uniform orientation and the same energy. Therefore, the liquid crystal molecules at the boundary between the domains has no strain. By contrast, as illustrated in FIG. 26A, under no voltage application, the liquid crystal molecules have a strain at the boundary between the domains different in the twist direction. When no voltage is applied to the liquid crystal, the liquid crystal molecules at the boundary between the domains different in the twist direction has a higher energy by a strain energy than an energy of the liquid crystal molecules at the boundary between the domains having the same twist direction. For this reason, if the cooling process is carried out under no voltage application, then it is likely that the domains different in the tilted-up direction but the same twist direction may be formed in contact with each other through surface. In this case, it is difficult to obtain a high contrast image. By contrast, as illustrated in FIG. 25B the liquid crystal molecules at the boundary between the domains different in the tilted-up direction but the same twist direction still remain directed in parallel to the surfaces of the substrates even after the voltage was applied to the liquid crystal. For this reason, a large strain is generated at the boundary between the domains different in the tilted-up direction but the same twist direction under the voltage application. On the other hand, as illustrated in FIG. 26B the liquid crystal molecules at the boundary between the domains different both in the tilted-up direction and in the twist direction are largely tilted-up nearly to the surfaces of the substrates after the voltage was applied to the liquid crystal. For this reason, a small strain is generated at the boundary between the domains different both in the tilted-up direction and in the twist direction under the voltage application. Accordingly, when the cooling process is carried out under the voltage application, the domains different in the tilted-up direction but the same twist direction are formed but not in contact with each other via surfaces. As a result, a wide angle of visibility and a high contrast image can be obtained.

If the different rubbing processes are carried out to the very small domains, the tilted-up direction of the liquid crystal is defined by the rubbing directions. For this reason, the orientation of the liquid crystal molecules at any positions are intentionally controlled by the rubbing. By contrast, according to the present invention, the very small domains are generated from the liquid crystal drops which have been generated when the liquid crystal is cooled down to a temperature below the phase transition temperature from the isotropic phase. At a part of the liquid crystal which is not applied with a sufficient non-uniform electric field, the control in shape of the very small domains may be insufficient. However, the domains different in the tilted-up direction of the liquid crystal but the same twist direction are formed but not in contrast with each other via surfaces. For this reason, the ray of light being transmitting through the boundary is free from scattering. Thus, the ray of light having transmitted trough the boundary is dark and has a black color. Therefore, a high contrast image can be obtained.

The above described structure of the domains may not sufficiently be stable when voltage ON-OFF operations are repeated. In this case, the boundary between the domains may move and any domain disappears. The tilting-up direction of the liquid crystal immediately after the voltage application commenced differs from the tilted-up direction of the liquid crystal sufficiently after the voltage application commenced. Immediately after the voltage application commenced, it is possible that the domains different in the tilted-up direction but the same twist direction are formed in contact with each other via surfaces. In this case, the ray light being transmitting through the boundary is subjected to scattering. Thus, the ray of light having transmitted trough the boundary has a whiteness component. Therefore, a high contrast image can not be obtained. The boundary between the domains becomes stable in the order of second. This means that the liquid crystal display can not show any high speed performance. Further, if the liquid crystal is heated up to the isotropic phase, then any domain may disappear. For this reasons, it is required to form the domains again under the non-uniform voltage application.

Figure 27:
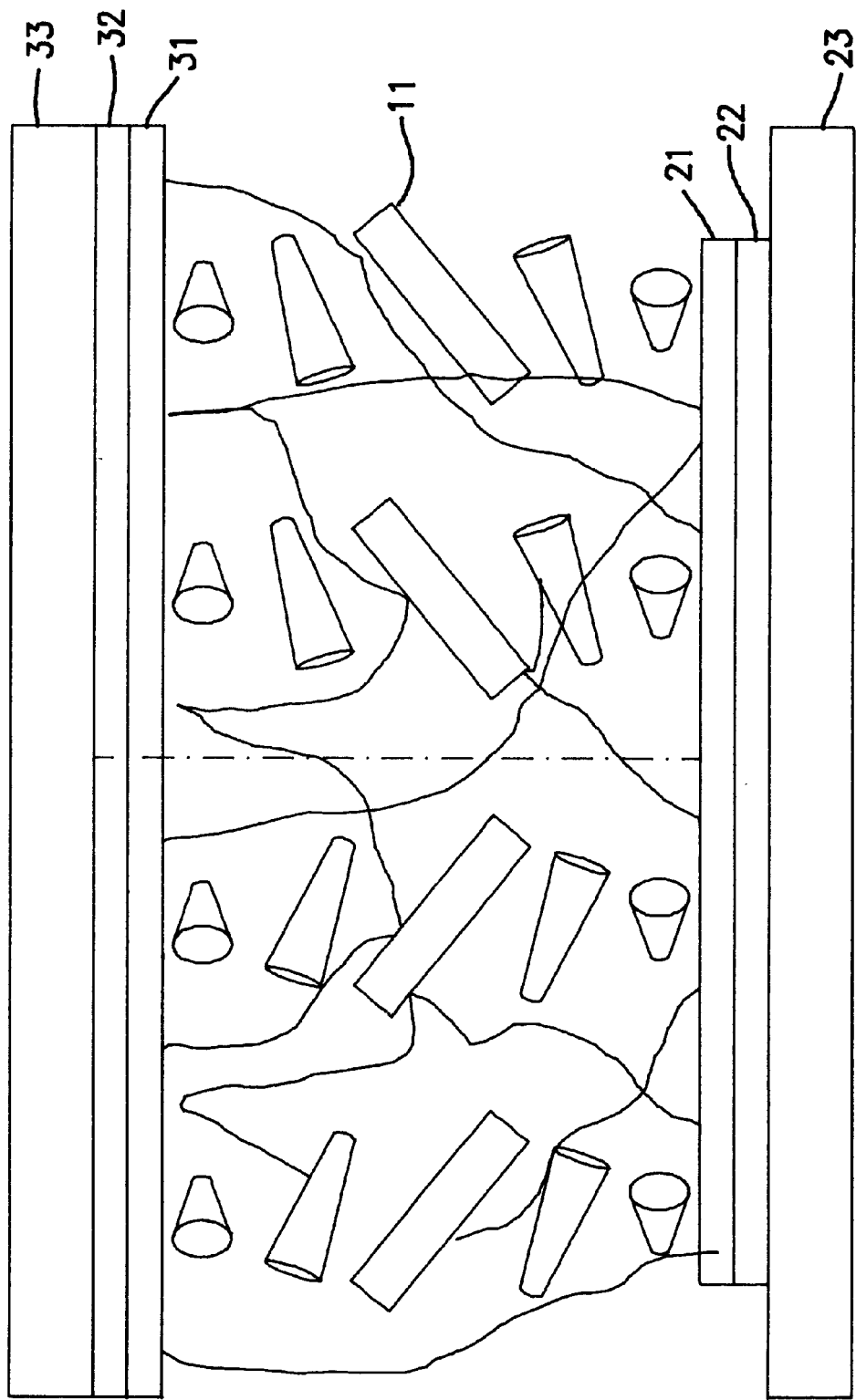
FIG. 27 is a cross sectional elevation view illustrative of liquid crystal molecules added with polymer within domains different in tilted-up direction and in twist direction.

In order to settle the problems as described in the just above paragraph, a network of polymer in the liquid crystal may be formed as illustrated in FIG. 27. The polymer 12 in the form of a network makes boundaries between the domains of four types stable and loosely fixed over positions. Even if the voltage ON-OFF operations are repeated, the boundary between the domains of four types are stable and loosely fixed over positions by the network of polymer 12. This results in no possibility of disappearance of domains when the liquid crystal is heated up to the isotropic phase. A small amount of polymer 12 can provide stability to the boundary between the domains and loosely fix the same.

Immediately after the voltage application is commenced, the small amount of polymer 12 can fix the direction of tilting up of the liquid crystal at the directed toward which the liquid crystal molecules remain tilted up sufficiently after the voltage application commenced. The small amount of polymer 12 can make the liquid crystal free from the problems with reduction in contrast of black and white due to whiteness of the ray of light transmitted through the boundary of the domains of different types. Further, the small amount of polymer 12 can make the liquid crystal free from the problem with delay in response speed. Even if the liquid crystal is heated up to the isotropic phase, the polymer can prevent disappearance of the domains.

Since the polymer is added in order to stabilize the domains different in the tilted-up direction and in the twist direction, it is unlimited to form the network of the polymer. For example, convex formations of the polymer may be provided on the substrate or fine beads of polymer dispersed in the orientation film to form uneven surfaces thereof.

A small amount of the polymer is sufficient for loosely fixing the domains. If an excess amount of the polymer is added into the liquid crystal, a disturbance in the orientation of the liquid crystal molecules is caused by the polymer or the liquid crystal molecules has a twist angle smaller than 90 degrees. Further, the ray of light being on the transmission through the liquid crystal may be subjected to scattering by the polymer. In view of the above, it may be preferable that the amount of the polymer to be added into the liquid crystal is not less than 0.02% by weight but not more than 4% by weight.

The polymer can memorize the tilting-up direction of the liquid crystal just after the voltage application commenced. For this reason, the remaining liquid crystal molecules will be tilted-up in the same direction as the liquid crystal molecules have already tilted-up whereby the boundary between the domains do not move. In order to fix the tilting-up direction of the remaining liquid crystal molecules at the same direction as the liquid crystal molecules have initially tilted up by the initial application of the voltage, it is required to add a somewhat larger amount of the polymer than when required to loosely fix the domains and the boundary between them.

A small amount of a monomer or an oligomer is added to the liquid crystal before the liquid crystal is injected between the substrates having the common electrode and the pixel electrode. The polymerization reaction of the monomer or the oligomer forms a network of polymer which acts like cell membranes confining some of the liquid crystal molecules. As a result, the network of polymer prevents movement of the boundaries of the different domains which have liquid crystal molecules tilted-up in different directions.

The monomer or the oligomer may be dissolved into the liquid crystal. After the injection of the liquid crystal into which the monomer or oligomer has already been dissolved, a voltage sufficiently low for preventing any remarkable variation in initial permissivity of light is applied to the liquid crystal so as to control a timing of causing the polymerization reaction of the monomer or the oligomer whereby a network of polymer is formed in the liquid crystal. As a result, the liquid crystal molecules with pretilted angles are confined in the network of polymer.

As described above, an optical shielding layer may be provided which is aligned to the opening provided in the common electrode for shielding the ray of light with whiteness transmitted through the boundaries between the different domains. In this case, it may be a voltage sufficiently low for preventing any remarkable variation in initial permissivity of light may be applied to the liquid crystal to allow the boundaries to move, so that just when the boundaries are aligned to the opening, the polymerization reaction of monomer or oligomer forms a network of polymer which fixes the boundaries to be covered by the optical shielding layer. The ray of light with whiteness transmitted through the boundaries between the domains is well shielded by the optical shielding layer provided at the opening. As a result, a desirable high contrast image can be obtained.

The present invention described above may of course be applicable to the liquid crystal display having a common electrode free of an opening.

As described above, the monomer or oligomer has previously been dissolved in the liquid crystal before injection of the liquid crystal into the liquid crystal cell between the substrates. Thereafter, the polymerization reaction of monomer or oligomer forms a network of polymer in the liquid crystal.

Alternatively, the polymer may be dissolved and dispersed in the liquid crystal before injection of the liquid crystal into the liquid crystal cell between the substrates.

Figure 28A:
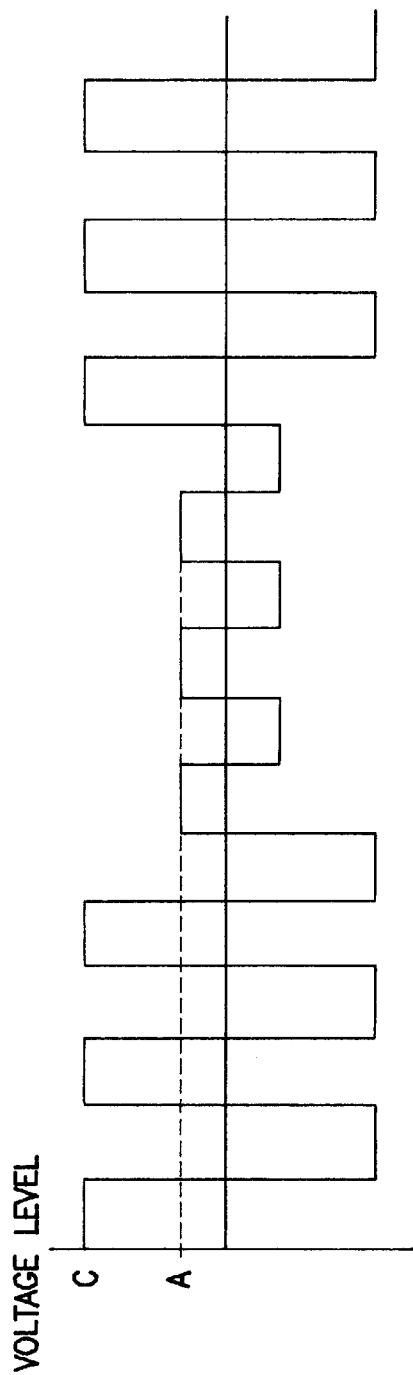
FIG. 28A is a diagram illustrative of a waveform of a voltage applied to the liquid crystal display according to the present invention.
Figure 28B:
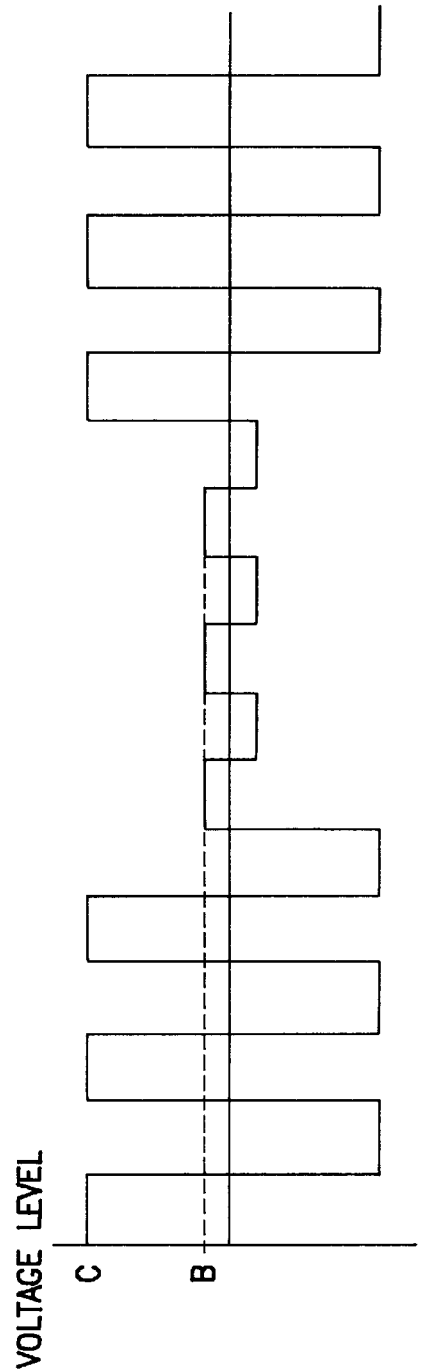
FIG. 28B is a diagram illustrative of a waveform of a voltage applied to the liquid crystal display in the prior art.
Figure 29:
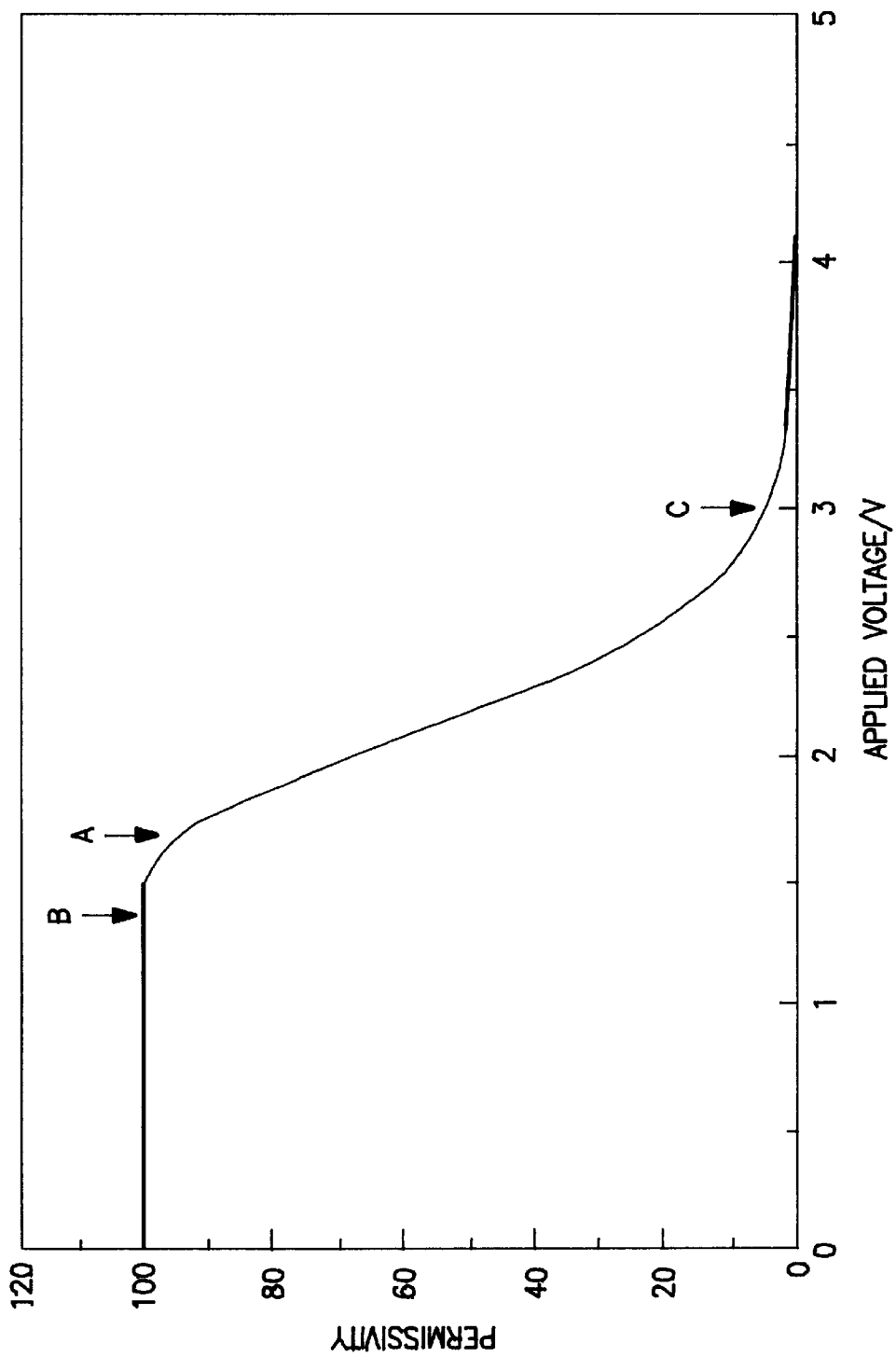
FIG. 29 is a diagram illustrative of a relationship of the permissivity of light versus applied voltage level.

The present invention provides a novel driving method for driving the liquid crystal display, wherein a low level voltage is higher than a threshold voltage of the liquid crystal molecules. The low level voltage means a lowest voltage level in gray scales. FIG. 28A illustrates a voltage waveform applied in the present invention. FIG. 28B illustrates a voltage waveform applied in the prior art. The high level and the low level correspond to the black and white in the normally white mode. FIG. 29 illustrates a relationship between the permissivity of light and the voltage level. In the prior art, the voltage level is switched between not more than a level B and a level C. When the voltage level is not more than the level B, the liquid crystal molecules are oriented in parallel to the surfaces of the substrates. When the voltage level is shifted to the level C, the liquid crystal molecules are tilted-up in the two different directions. The liquid crystal molecules aligned at the boundary different in the tilted-up direction remain oriented in parallel to the surfaces of the substrates even after the voltage application commenced. For this reason, the ray of light being on the transmission through the boundary between the domains different in the tilted-up direction is subjected to scattering whereby the ray of light having transmitted through the boundary has a whiteness component. The boundary between the domains may move during a time of second order from immediately after the voltage application commenced. This means that the display shows a slow response speed and a narrow angle of visibility.

By contrast, in accordance with the driving method of the present invention, even if the low level voltage is applied, the low level voltage is a level A which is higher than a threshold voltage of the liquid crystal molecules. Since the low level voltage is higher than the threshold voltage of the liquid crystal molecules, the liquid crystal molecules are slightly tilted-up in any direction. When the voltage level is shifted to the level C, the liquid crystal molecules are largely tilted-up in the same direction as previously tilted-up. Namely, the tilting-up direction of the liquid crystal molecules remains unchanged. When the domains different in the tilted-up direction but the same twist direction are formed but not in contact with each other via surfaces in the manner described above, the liquid crystal molecules at the boundary between the domains are largely tilted-up nearly to the vertical direction to the surfaces of the substrates and the boundary is fixed over positions. As a result, the ray of light can transmit without receiving any scattering through the boundary between the domains. The ray of light transmitted through the boundary is black with no white component.

If the display is driven by the thin film transistor, it is required that the liquid crystal has a large resistivity and a large retention of electric charge. Fluorine system and chlorine system may be available as a liquid crystal. It is preferable that the liquid crystal shows no reduction in retention of electric charge even when exposed to the visible rays of light and the ultraviolet ray.

Further, in order to improve the visible angle property, a compensation plate may be provided between the liquid crystal cell and the polarization film.

The compensation plate is used to compensate the positive refractive index anisotropy of possessed by the liquid crystal molecules. For this reason, it is required that the optical compensation plate has anisotropic negative refractive index. Particularly when the compensation plate is used to the display having the domains of four types different in the tilted-up direction and in the twist direction of the liquid crystal, the compensation plate can provide symmetrical optical property without unintentional coloring. It is more preferable to provide different orientation films for every domains of four types. It is also preferable to use an optical compensation plate having a tilted optical axis. In consideration of the tilted-up direction of the liquid crystal molecules, it is further preferable to use an optical compensation plate having an optical axis tilted from a vertical axis. Such optical compensation plate may be formed in the manner by drawing a film between rolls having different rotation speeds.

Whereas modifications of the present invention will be apparent to a person having ordinary skill in the art, to which the invention pertains, it is to be understood that embodiments to be shown and described by way of illustrations are by no means intended to be considered in a limiting sense. Accordingly, it is to be intended to over by claims all modifications which fall within the spirit ad scope of the present invention.

EXAMPLE 1

A substrate was used which has thin film transistor arrays wherein a single pixel has a size of 100 micrometers×300 micrometers and the number of pixels is 480×640×3 in addition a diagonal size of a display screen is 240 millimeters.

The two substrates were cleaned before a polyimide orientation agent JALS-428 was applied onto the substrates by a spin coating method. The substrates were then burned up two times at temperature of 90° C. and 220° C. The substrates were subjected to rubbing by use of a buff cloth of rayon. The rubbing direction differ from each other by 90 degrees between the substrates, wherein the rubbing directions are parallel to the diagonal directions of the substrates. Adhesive was applied on a peripheral region of the substrate before latex spheres having a diameter of 6 micrometers were dispersed, which will serve as spacers. The substrates were aligned and combined with each other under pressure so that the pixel arrays were aligned between the substrates. The combined substrates were placed in a vacuum bath for subsequent evacuation. Nematic liquid crystal ZLI4792 was injected, wherein a chiral agent S811 is mixed to the namatic liquid crystal so that a spontaneous pitch became 70 micrometers. Thereafter, the substrates were heated up to 90° C. and then cooled down to a room temperature. The liquid crystal was observed by optical microscopy. Under no voltage application, a single domain existed in each pixel in which liquid crystal molecules were oriented in a uniform direction. When a voltage was applied to the liquid crystal, the liquid crystal molecules were tilted-up in the different two directions and two different domains were generated, which differ in the tilted-up direction of the liquid crystal molecules. The domains of two types remained fixed over positions with times.

A polarization plate was provided on the liquid crystal display before the display was placed on a rotation stage and then a colorimeter BM-5A was placed in front of the display to measure the visible angle dependency of the optical property. The display was carried out in eight gray scales so that the visible angle dependency of the optical property was measured for every gray scales. Within a view angle of 40 degrees, no inversion of the brightness between the gray scales was generated.

The orientation film was similarly formed on a substrate of 30 millimeters×40 millimeters free of thin film transistor arrays. By use of spacers of 50 millimeters, a liquid crystal cell was formed. The pretilted angle of the liquid crystal molecules was measured by a crystal rotation method. The pretilted angle 0.05 degrees.

EXAMPLE 2

An optical compensation plate was used to evaluate an effect of the optical compensation plate. The optical compensation plate was selected to be a phase difference film VAC-100 having an index ellipsoid with a short axis which is vertical to the surface of the film. The liquid crystal display was prepared in the same manner and under the same conditions as in EXAMPLE 1. Tie optical compensation plate was adhered between the liquid crystal cell and the polarization plate. A calorimeter BM-5A was placed in front of the display to measure the visible angle dependency of the optical property. The display was carried out in eight gray scales so that the visible angle dependency of the optical property was measured for every gray scales. Within a view angle of 40 degrees, no inversion of the brightness between the gray scales was generated. A contrast in an oblique angle is improved and better than that of EXAMPLE 1.

COMPARATIVE EXAMPLE 1

The liquid crystal display was prepared in the same manner and the same conditions as in EXAMPLE 1 except for use of a general polyimide orientation film AL1051. The liquid crystal molecules were observed by polarization microscopy to confirm that the single uniform domain only existed even after the voltage application commenced. The visible angle was measured in the same manner as EXAMPLE 1. Within an visible angle of 10 degrees an inversion of brightness between the gray scales was generated. The pretilted angle measured was 1.0 degree.

EXAMPLE 3

The liquid crystal display was prepared in the same manner and the same conditions as in EXAMPLE 1 except that xylene solution of polystyrene was used for an orientation film and that the substrates were burned up at a temperature of 120° C. The liquid crystal molecules were observed by polarization microscopy to confirm that domains of different two types which differ in the tilted-up direction of the liquid crystal molecules coexisted after the voltage application commenced. The visible angle was measured in the same manner as EXAMPLE 1. Within an visible angle of 40 degrees no inversion of brightness between the gray scales was generated. The pretilted angle measured was 0.07 degrees.

EXAMPLE 4

The liquid crystal display was prepared in the same manner and the same conditions as in EXAMPLE 1 except that as a liquid crystal a mixed solution was used of ZLI4792, 1 wt % of 4,4-diacryloyloxybiphenylacrylate to liquid crystal, and 1 wt % of benzoinmethylether to monomer. After an injection hole was opened the liquid crystal was exposed to ultraviolet ray at a room temperature. The liquid crystal remained transparent after the exposure thereof to the ultraviolet ray. The liquid crystal molecules were observed by polarization microscopy to confirm that domains of different two types which differ in the tilted-up direction of the liquid crystal molecules coexisted after the voltage application commenced. The visible angle was measured in the same manner as EXAMPLE 1. Within an visible angle of 40 degrees no inversion of brightness between the gray scales was generated.

EXAMPLE 5

The liquid crystal display was prepared in the same manner and the same conditions as in EXAMPLE 1 except that as a liquid crystal a mixed solution was used of ZLI4792, 0.2 wt % of KAYARAD PET-30, and 1 wt % of ILGANOX 907 to monomer. After the liquid crystal was heated up to 100° C. which is higher than the phase transition temperature between the liquid crystal phase and the isotropic phase. The liquid crystal heated up was then exposed to ultraviolet ray at 0.1 mW/cm$^2$. The liquid crystal was cooled down at a rate of 10° C./min. under an application of voltage at 5V.

Figure 30:
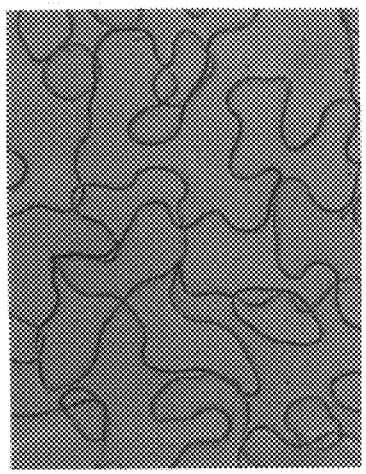
FIG. 30 is photograph illustrative of the domains of four types which differ in the tilted-up direction and in the twist direction of the liquid crystal molecules coexisted under no voltage application.
Figure 31:
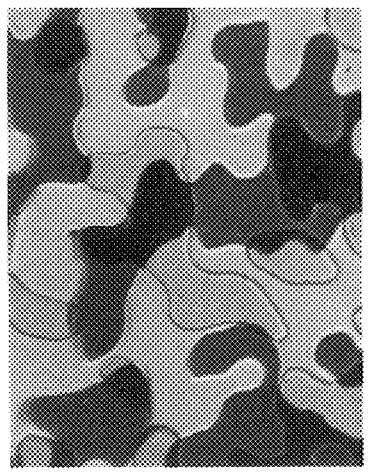
FIG. 31 is photograph illustrative of the domains of four types which differ in the tilted-up direction and in the twist direction of the liquid crystal molecules coexisted under a voltage application.

FIGS. 30 and 31 are photographs illustrative of the domains of four types which differ in the tilted-up direction and in the twist direction of the liquid crystal molecules coexisted under no voltage application and under a voltage application at 3V respectively. Different gray scales represent different orientation directions. The display panel was slightly oblique to be observed. The liquid crystal molecules were observed by polarization microscopy to confirm that domains of different four types which differ in the tilted-up direction and in the twist direction of the liquid crystal molecules coexisted.

Immediately after the voltage application commenced, the domains different in the tilted-up direction but the same twist direction were formed in contact with each other via surface boundary. Notwithstanding, with times, the surface boundary disappeared and thus the domains different in the tilted-up direction but the same twist direction became in contact with each other via line boundary. The visible angle was measured in the same manner as EXAMPLE 1. Within an visible angle of 50 degrees no inversion of brightness between the gray scales was generated. A liquid crystal evaluator LCD-5000 was used to measure the permissivity of light in the vertical direction versus voltage levels. The measured permissivity of light versus voltage levels is illustrated in FIG. 29. The measured property is almost the same as the normal twisted nematic liquid crystal display. When 5V was applied, a contrast of 200:1 or more was obtained.

The visible property was measured in gray scale display over various azimuths at an interval of 45 degrees. The measured visible properties for every azimuths are illustrated in FIGS. 32A through 32H. Almost the same visible properties over all the azimuths were confirmed. Within an visible angle of 50 degrees no inversion of brightness between the gray scales was generated.

Figure 33:
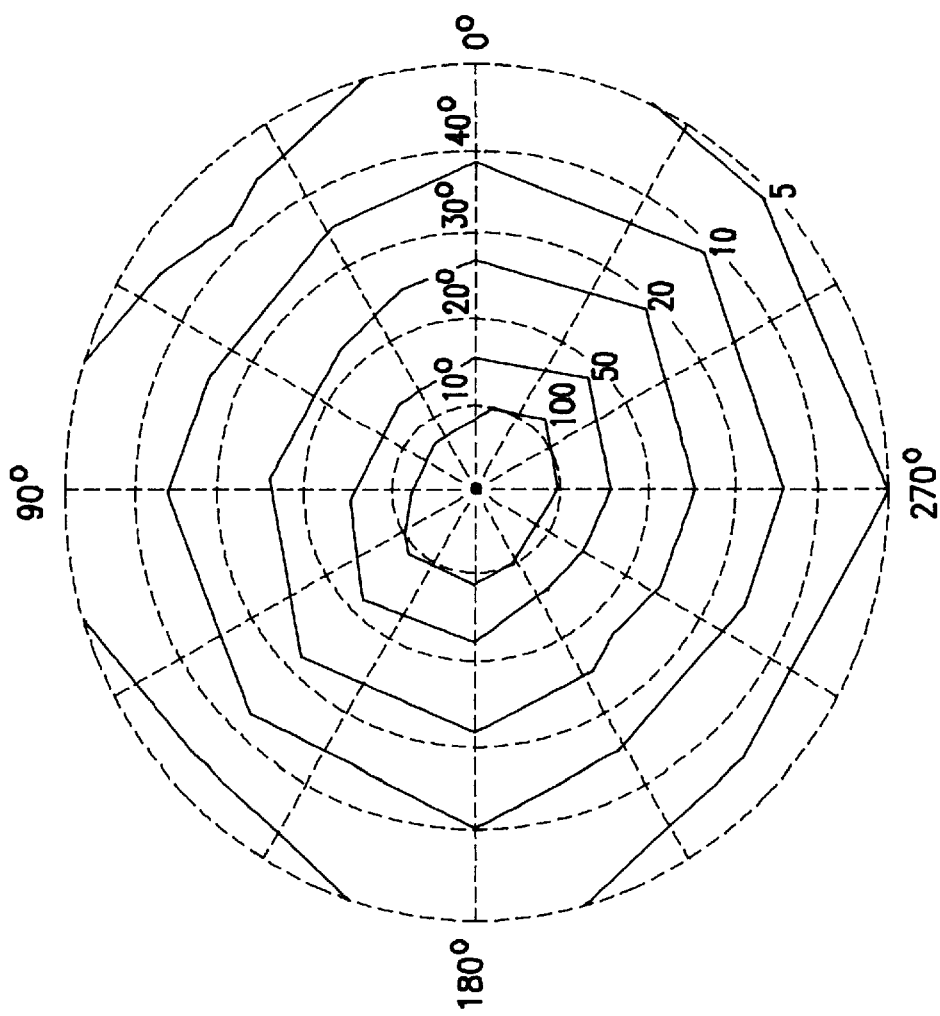
FIG. 33 illustrates the contrast between 1V and 5V as a conoscope image. Isocontrast curves have a shape almost circle.

FIG. 33 illustrates the contrast between 1V and 5V as a conoscope image. Isocontrast curves have a shape almost circle. This demonstrates that the visible property remains unchanged in all directions.

EXAMPLE 6

The liquid crystal display panel prepared in EXAMPLE 5 was cooled at various speed in the range of 1° C./min. to 20° C./min. It was confirmed that when the cooling speed becomes large, the size of the domains of four different types becomes small.

EXAMPLE 7

The liquid crystal display panel prepared in EXAMPLE 5 was cooled at various voltage levels of 2V, 3V, 5V and 10V. It was confirmed that when the voltage level becomes high, the size of the domains of four different types becomes small.

EXAMPLE 8

The liquid crystal display panel was prepared in the same manner as in EXAMPLE 5 except for varying the content of monomer in the range of 0.1% to 1.0% at a cooling speed of 10° C./min. If the content of monomer became large, the size of the domains of four different types became small. If the content of monomer was not less than 0.5 wt %, the liquid crystal molecules were tilted-up in a uniform direction. No boundary between domains different in the tilted-up direction but the same twist direction was observed after the voltage application commenced. If the content of monomer was not more than 0.3 wt %, a movement of boundary between domains different in the tilted-up direction but the same twist direction was observed immediately after the voltage application commenced.

EXAMPLE 9

Figure 34:
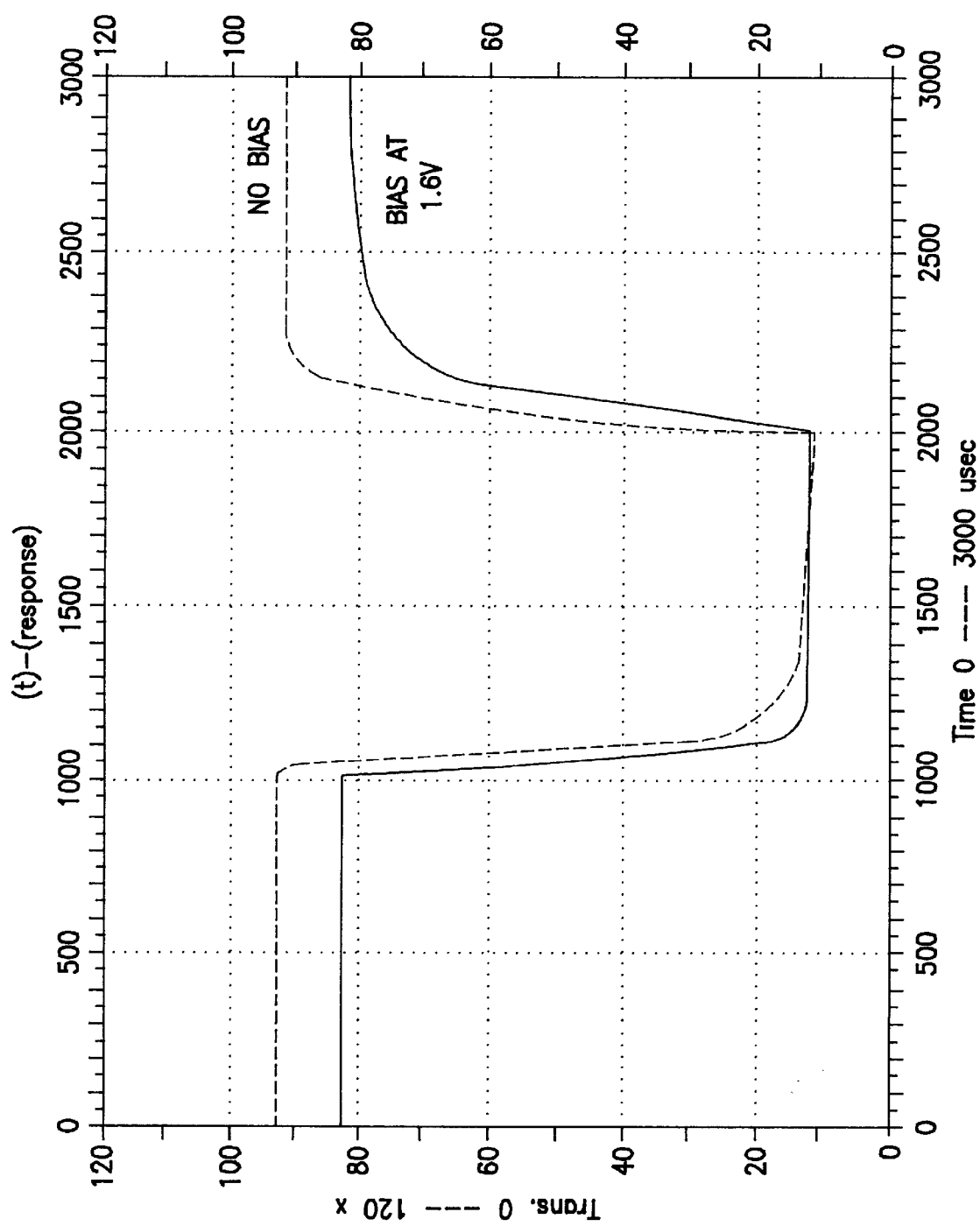
FIG. 34 illustrates response speeds of liquid crystal molecules under no voltage application and under 1.6V voltage application.

The liquid crystal display panel prepared in EXAMPLE 5 was driven at a voltage of 1.6V which is higher than the threshold voltage of the liquid crystal. It was confirmed that the tilted-up direction of the liquid crystal molecules remains unchanged immediately after the voltage application commenced. No reduction in contrast of image nor variation in visible property of the liquid crystal display was observed. FIG. 34 illustrates response speeds of liquid crystal molecules under no voltage application and under 1.6V voltage application. If no voltage was applied, the permissivity of light is changed slowly in the order of second. By contrast, if a voltage was applied at 1.6V then the permissivity of light is changed quickly.

COMPARATIVE EXAMPLE 2

The liquid crystal display panel was prepared in the same manner as in EXAMPLE 5 except for exposing the liquid crystal to ultraviolet ray at a room temperature. The liquid crystal molecules memorized the orientation when exposed to the ultraviolet ray, for which reason it was difficult to control the size of the fine domains.

EXAMPLE 10

The liquid crystal display panel was prepared in the same manner as in EXAMPLE 5 except for exposing the liquid crystal to ultraviolet ray at a room temperature but under a voltage application at 10V. It was easy to control the size of the fine domains by controlling the cooling speed and the applied voltage level.

EXAMPLE 11

Figure 37:
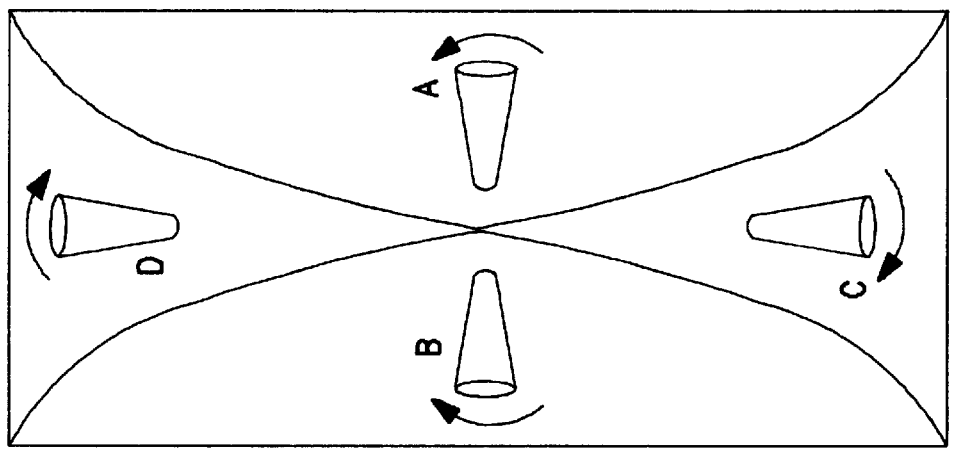
FIG. 37 is a view illustrative of domains of four types different both in tilted-up direction and in twist direction of liquid crystal molecules.

The liquid crystal display panel was prepared in the same manner as in EXAMPLE 5 except for exposing the liquid crystal to ultraviolet ray and the content of monomer at 0.5 wt %. At first, an irradiation of ultraviolet ray was carried out for three minutes at 0.1 mW/cm$^2$ whereby the domains became stable and fixed but the direction of the tilted-up of the liquid crystal molecules was not fixed and still unstable. A movement of the boundary through which the ray of light with whiteness has transmitted was observed. At a second stage, the liquid crystal was exposed to ultraviolet ray for sixty minutes at a room temperature. The tilted-up directions of the liquid crystal molecules were fixed. The visible property was symmetrical in all directions. By use of a substrate with both a thin film transistor and the above orientation film as well as a color filter substrate, the liquid crystal display panel was prepared in the same manner as in EXAMPLE 2. It was confirmed that the same structure as illustrated in FIG. 37 was formed after cooling process. The visible angle was measured in the same manner as EXAMPLE 1. Within an visible angle of 60 degrees no inversion of brightness between the gray scales was generated. The measured contrast was 150:1. The pretilted angle measured was almost 0 degree.

EXAMPLE 12

Figure 35A:
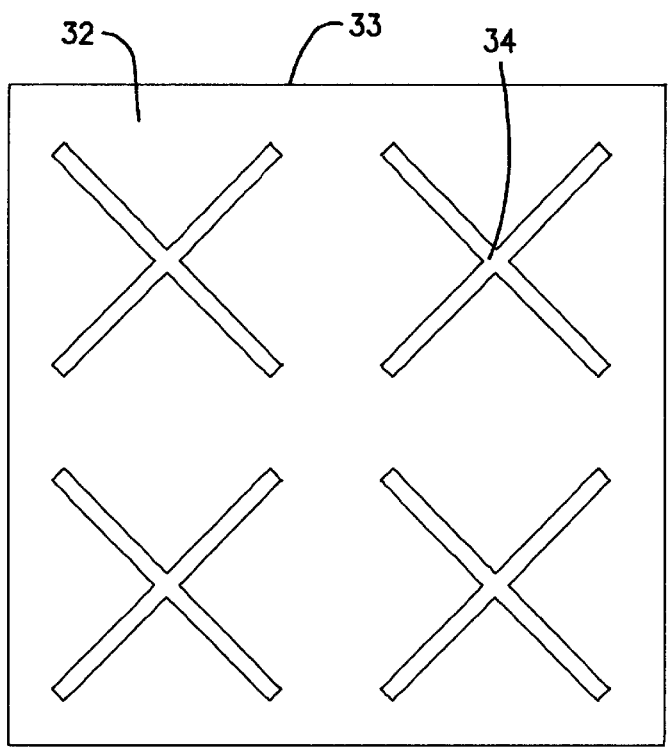
FIG. 35A is a plane view illustrative of an orientation substrate which X-shaped openings.
Figure 35B:
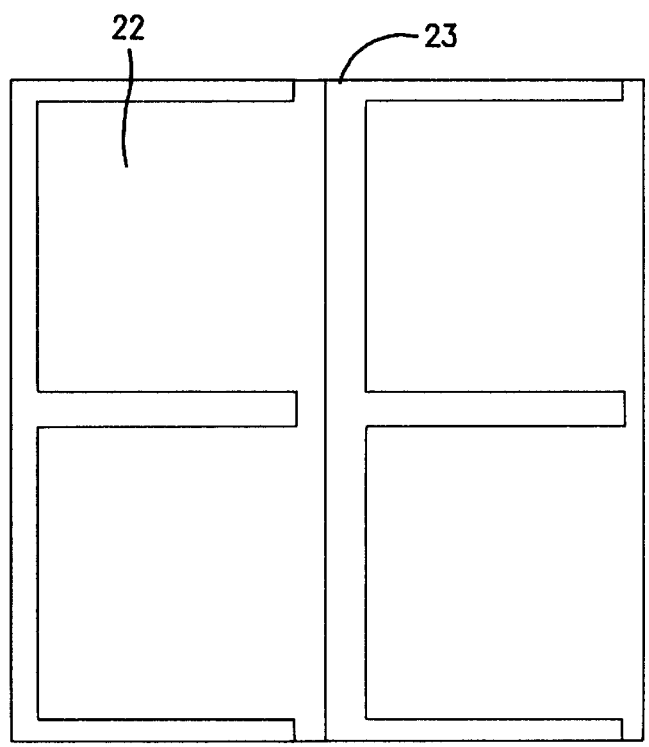
FIG. 35B is a plane view illustrative of an orientation substrate which has pixel electrodes aligned.

With reference to FIGS. 35A and 35B, an orientation substrate 33 was used which has X-shaped openings with a width of 5 micrometers. Another orientation substrate 23 was used which has pixel electrodes aligned at a distance of 10 micrometers wherein each the pixel electrodes has a size of 100 micrometers×100 micrometers.

Figure 36:
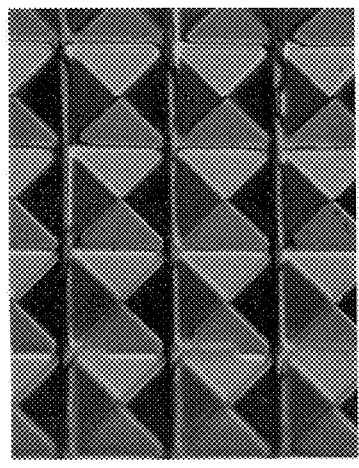
FIG. 36 is a polarization microscopic photograph illustrative of the liquid crystal.
Figure 32A:
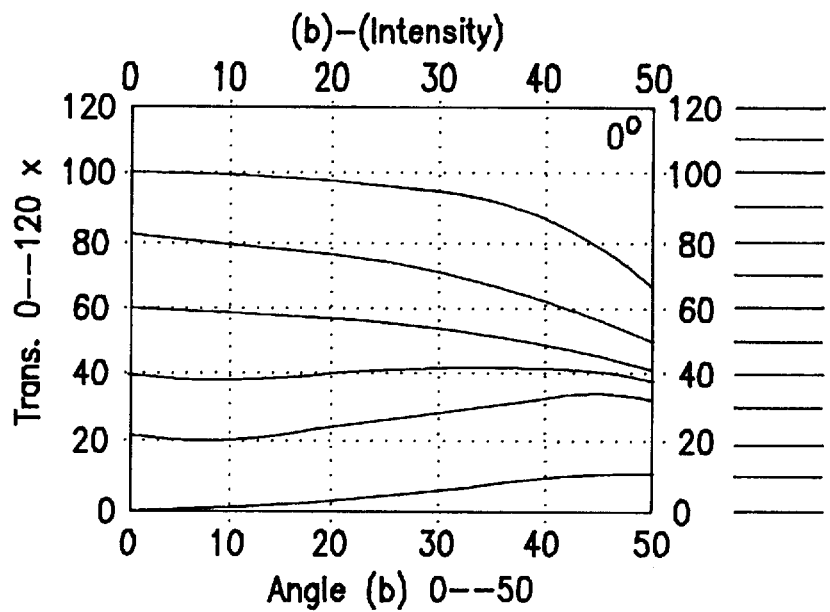
FIGS. 32A through 32H are diagrams illustrative of measured visible property in gray scale display over various azimuths at an interval of 45 degrees.
Figure 32B:
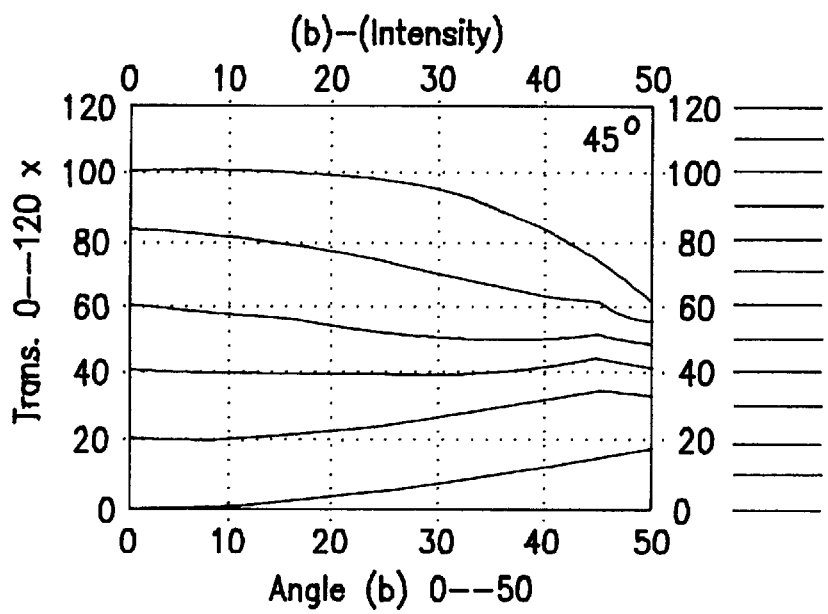
Figure 32C:
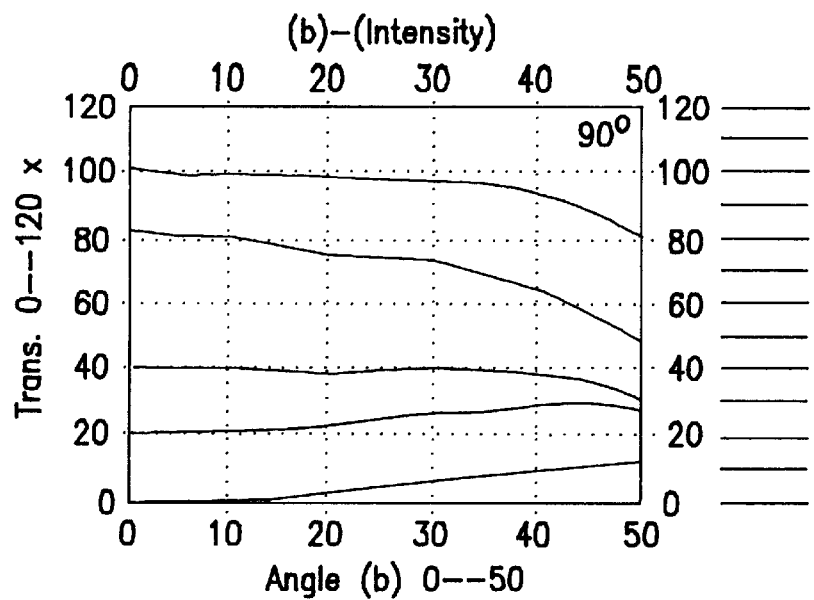
Figure 32D:
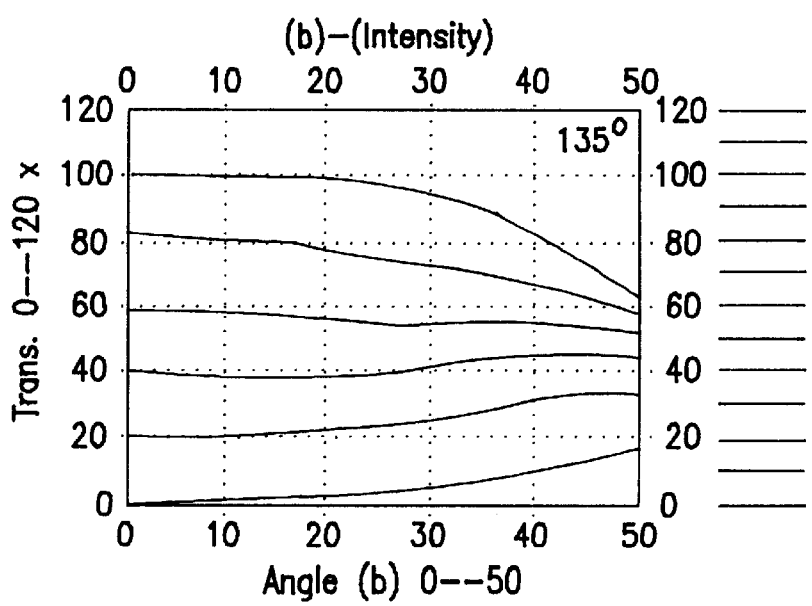
Figure 32E:
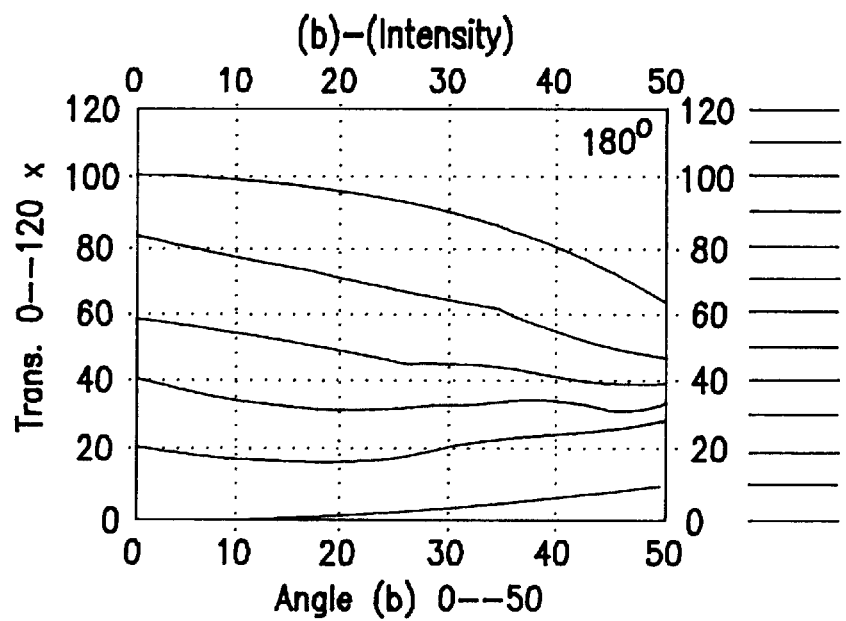
Figure 32F:
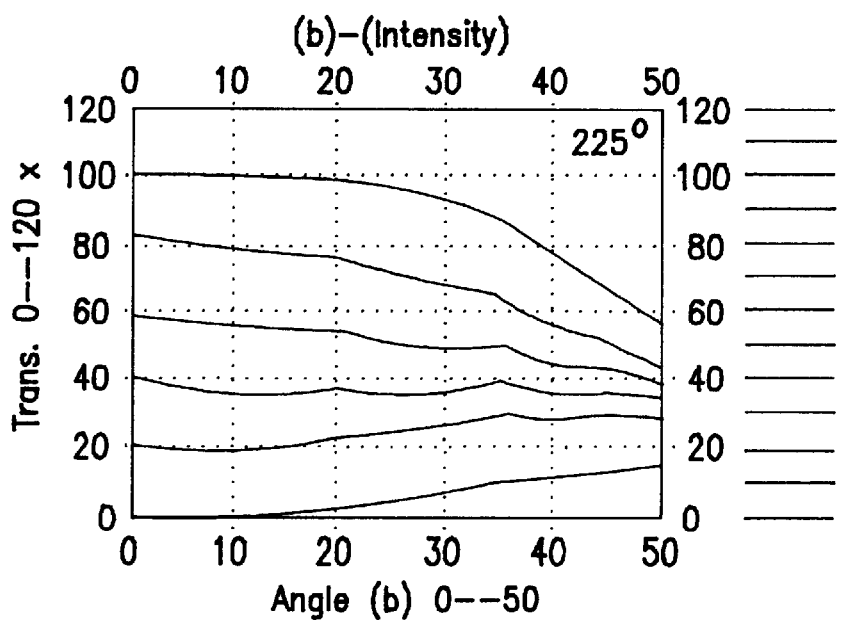
Figure 32G:
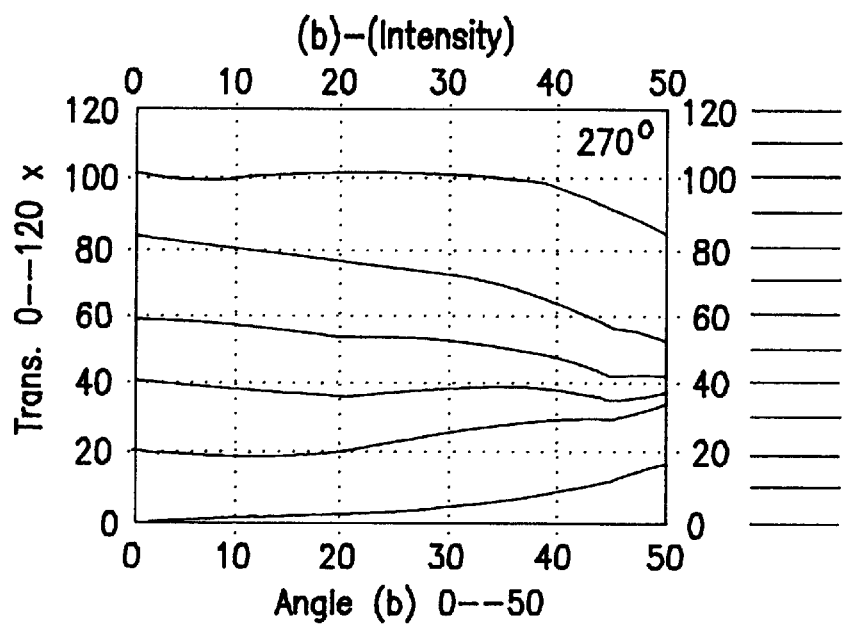
Figure 32H:
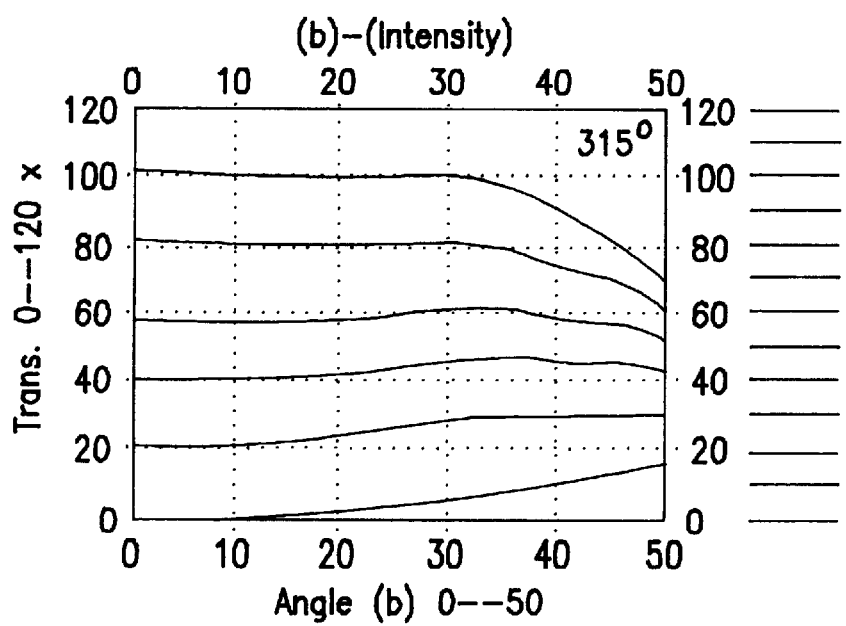

The two substrates 23 and 33 were cleaned before a polyimide orientation agent JALS-428 was applied onto the substrates by a spin coating method. The substrates were then burned up two times at temperature of 90° C. and 220° C. The substrates were subjected to rubbing by use of a buff cloth of rayon. The rubbing direction differ from each other by 90 degrees between the substrates, wherein the rubbing directions are parallel to the diagonal directions of the substrates. Adhesive was applied on a peripheral region of the substrate before latex spheres having a diameter of 6 micrometers were dispersed, which will serve as spacers. The substrates were aligned and combined with each other under pressure so that the openings were aligned to centers of the pixel electrodes. The combined substrates were placed in a vacuum bath for subsequent evacuation. Nematic liquid crystal ZLI4792 having a phase transition temperature of 92° C. was injected, wherein 0.2 wt % of an ultraviolet ray curing monomer KAYARAD PET-30 and 5 wt % of an initiator ILGANOX 907 to monomer is mixed to the namatic liquid crystal. Thereafter, the substrates were heated up to 110° C. and then subjected to ultraviolet ray at 0.1 mW/cm$^2$ for 30 minutes. The substrates were cooled down at a cooling speed of 20° C./min. under a voltage application of 8V with a frequency of 10 Hz. The liquid crystal was observed by optical microscopy. FIG. 36 is a polarization microscopic photograph illustrative of the liquid crystal. The photograph was taken by slightly tilting the liquid crystal cell under a voltage application at an intermediate level. Each section having the size of 100×100 micrometers is divided into four domains by the X-shaped opening. From variation in brightness in slightly tilting the liquid crystal cell, it was confirmed that the four domains differ in the tilted-up direction of the liquid crystal molecules as illustrated in FIG. 19. The liquid crystal molecules differ in twisted direction between the adjacent two sections having the size of 100×100 micrometers. It was confirmed that the ray of light having transmitted through the boundary between adjacent pixels has no whiteness component. This suggests that the domains different in the tilted-up direction but the same twist direction are formed not in contact with each other via surfaces. After the voltage application commenced, the tilted-up direction of the liquid crystal molecules remained unchanged with times. Even the voltage ON-OFF operations were repeated for a long time, no domain was disappeared.

A polarization plate was provided on the liquid crystal display before the display was placed on a rotation stage and then a colorimeter BM-5A was placed in front of the display to measure the visible angle dependency of the optical property. The display was carried out in eight gray scales so that the visible angle dependency of the optical property was measured for every gray scales in all directions at an interval of 45 degrees. Within a view angle of 60 degrees, no inversion of the brightness between the gray scales was generated. The liquid crystal evaluator LCD-5000 was used to measure the contrast under a voltage application at 5V. The measured contrast was 200:1.

EXAMPLE 13

A substrate was used which has thin film transistor arrays wherein a single pixel has a size of 100 micrometers×300 micrometers and the number of pixels is 480×640×3 in addition a diagonal size of a display screen is 240 millimeters. On the top substrate, RGB color filter is provided and. A common electrode without opening is also provided entirely on the top substrate. A bottom electrode is provide with a thin film transistor and with a pixel electrode as well as a gate line and a drain line.

The two substrates were cleaned before a polyimide orientation agent JALS-428 was applied onto the substrates by a spin coating method. The substrates were then burned up two times at temperatures of 90° C. and 220° C. The substrates were subjected to rubbing by use of a buff cloth of rayon. The rubbing direction differ from each other by 90 degrees between the substrates, wherein the rubbing directions are parallel to the diagonal directions of the substrates. Adhesive was applied on a peripheral region of the substrate before latex spheres having a diameter of 6 micrometers were dispersed, which will serve as spacers. The substrates were aligned and combined with each other under pressure so that the pixel arrays were aligned between substrates. The combined substrates were placed in a vacuum bath for subsequent evacuation. Nematic liquid crystal ZLI4792 was injected, wherein 0.3 wt % of monomer sensitive to ultraviolet ray was mixed to the namatic liquid crystal so that a spontaneous pitch became 70 micrometers. Thereafter, the substrates were heated up to 100° C. for subsequent exposure thereof to a ultraviolet ray at 0.2 mW/cm² for 60 minutes. The gate line was applied with a pulse signal 33 Hz, 15V and 32 microseconds. The drain line was applied with a rectangular waveform signal of 33 Hz and 8V, during which the substrates were cooled down to a room temperature. The liquid crystal was observed by optical microscopy. FIG. 37 illustrates the domains of four types different in the tilted-up direction and in the twist direction of the liquid Crystal molecules. When a voltage was applied to the liquid crystal, the liquid crystal molecules were tilted-up in the different four directions and domains of four types different in the tilted-up direction and in the twist direction of the liquid crystal molecules were generated. The domains different in the tilted-up direction but the same twist direction were formed not in contact with each other via surfaces. The domains of four types remained fixed over positions with times after the voltage application commenced. The ray of light having transmitted through the boundary between the domains different in the tilted-up direction but the same twist direction had no whiteness component. Even when the voltage ON-OFF operations were repeated for a long time, no disappearance of any domain was observed.

A polarization plate was provided on the liquid crystal display before the display was placed on a rotation stage and then a calorimeter BM-5A was placed in front of the display to measure the visible angle dependency of the optical property. The display was carried out in eight gray scales so that the visible angle dependency of the optical property was measured for every gray scales in all directions at an interval of 45 degrees. Within a view angle of 60 degrees, no inversion of the brightness between the gray scales was generated. The liquid crystal evaluator LCD-5000 was used to measure the contrast under a voltage application at 5V. The measured contrast was 150:1.

COMPARATIVE EXAMPLE 3

The liquid crystal display was prepared in the same manner as in EXAMPLE 13 except for no voltage application in cooling process. Domains of four types different in the tilted-up direction coexisted. The domains of four types were formed in random. When a voltage was applied, the tilted-up direction of the liquid crystal molecules are in random except on a peripheral region of each pixel. After a sufficient time passed, boundaries through which the ray of light with whiteness had transmitted were observed. By observation in an oblique angle, the domains different in the tilted-up direction but the same twist direction were formed in contact with each other via surfaces. The movement of the surface boundary between the domains after the voltage application commenced was observed.

The liquid crystal evaluator LCD-5000 was used to measure the contrast under a voltage application at 5V. The measured contrast was 50:1.

COMPARATIVE EXAMPLE 4

The liquid crystal display was prepared in the same manner as in EXAMPLE 13 except for exposure to ultraviolet ray at a room temperature. Domains of two types different in the twist direction coexisted. Domains of four types different both in the tilted-up direction and in the twist direction were not observed. A polarization plate was provided on the liquid crystal display before the display was placed on a rotation stage and then a calorimeter BM-5A was placed in front of the display to measure the visible angle dependency of the optical property. The display was carried out in eight gray scales so that the visible angle dependency of the optical property was measured for every gray scales in all directions at an interval of 45 degrees. Within a view angle of 10 degrees, an inversion of the brightness between the gray scales was generated.

EXAMPLE 14

The liquid crystal display was prepared in the same manner as in EXAMPLE 12 except both for the use of two kinds of polyimide orientation films having a small pretilted angle and for setting a concentration of monomer at 0.5 wt %. The two kinds of polyimide orientation films were TAL1007 and K104 treated with ethyl lactic acid. Coexistence of domains four types different both in the tilted-up direction and in the twist direction was observed. The domains different in the tilted-up direction but the same twist direction were formed not in contact with each other via surfaces. The measured pretilted angles of the two kinds of orientation films were 0.35 degrees and 0.5 degrees respectively.

COMPARATIVE EXAMPLE 5

The liquid crystal display was prepared in the same manner as in EXAMPLE 12 except for use of a polyimide orientation film of AL1051. It was observed by polarization microscopy that domains of different types were once generated immediately after the voltage application commenced. With time, the domains disappeared and became a single domain. A polarization plate was provided on the liquid crystal display before the display was placed on a rotation stage and then a colorimeter BM-5A was placed in front of the display to measure the visible angle dependency of the optical property. The display was carried out in eight gray scales so that the visible angle dependency of the optical property was measured for every gray scales in all directions at an interval of 45 degrees. Within a view angle of 10 degrees, an inversion of the brightness between the gray scales was generated. The measured pretilted angle of the orientation film was 1.0 degree.

EXAMPLE 15

The liquid crystal display was prepared in the same manner as in EXAMPLE 13 except for setting a concentration of monomer at 1.0 wt %. The liquid crystal panel was heated up to a temperature of 100 degrees for subsequent exposure thereof to ultraviolet ray at 0.2 mW/cm$^2$ for 5 minutes. The gate line was applied with a pulse signal of 33 Hz, 15V and 32 microseconds. The drain line was applied with a triangular waveform signal of 33 Hz and 10V, during which the substrates were cooled down to a room temperature. Thereafter, the liquid crystal was then exposed to ultraviolet ray at 0.1 mW/cm$^2$ for 120 minutes. The liquid crystal was observed by optical microscopy. FIG. 37 illustrates the domains of four types different in the tilted-up direction and in the twist direction of the liquid crystal molecules. When a voltage was applied to the liquid crystal, the liquid crystal molecules were tilted-up in the different four directions and domains of four types different in the tilted-up direction and in the twist direction of the liquid crystal molecules were generated. The domains different in the tilted-up direction but the same twist direction were formed not in contact with each other via surfaces. The domains of four types remained fixed over positions with times after the voltage application commenced. The ray of light having transmitted through the boundary between the domains different in the tilted-up direction but the same twist direction had no whiteness component. Even when the voltage ON-OFF operations were repeated for a long time, no disappearance of any domain was observed.

EXAMPLE 16

The liquid crystal display was prepared in the same manner as in EXAMPLE 12 except both for use of xylene solution of polystyrene as an orientation film and for setting a burring temperature at 120° C. By the polarization microscopy it was observed that domains of four types different in the tilted-up direction coexisted after the voltage application commenced. Domains different in the tiled-up direction but the same twist direction were formed not in contact with each other via surfaces.

A polarization plate was provided on the liquid crystal display before the display was placed on a rotation stage and then a colorimeter BM-5A was placed in front of the display to measure the visible angle dependency of the optical property. The display was carried out in eight gray scales so that the visible angle dependency of the optical property was measured for every gray scales in all directions at an interval of 45 degrees. Within a view angle of 60 degrees, no inversion of the brightness between the gray scales was generated. The measured pretilted angle of the orientation film was 0.07 degrees.

EXAMPLE 17

The liquid crystal display was prepared in the same manner as in EXAMPLE 12 except that as a liquid crystal a mixed solution was used of ZLI4792 added with 1 wt % of 4,4'-diacryloxybiphenylacrylate to liquid crystal, and 1 wt % of benzoinmethylether to monomer.

A polarization plate was provided on the liquid crystal display before the display was placed on a rotation stage and then a calorimeter BM-5A was placed in front of the display to measure the visible angle dependency of the optical property. The display was carried out in eight gray scales so that the visible angle dependency of the optical property was measured for every gray scales in all directions at an interval of 45 degrees. Within a view angle of 60 degrees, no inversion of the brightness between the gray scales was generated.

EXAMPLE 18

The liquid crystal display was prepared in the same manner as in EXAMPLE 12 except for setting a concentration of monomer sensitive to ultraviolet ray at 0 wt %, 0.01 wt %, 0.02 wt %, 0.05 wt % and 0.1 wt %. By the polarization microscopy it was observed that domains of four types different in the tilted-up direction coexisted after the voltage application commenced. Domains different in the tiled-up direction but the same twist direction were formed not in contact with each other via surfaces. If, however, in cases of the monomer concentrations at 0 wt % and 0.01 wt %, disappearance of the domains of four types by the repeated voltage ON-OFF operations was observed.

EXAMPLE 19

The liquid crystal display was prepared in the same manner as in EXAMPLE 12 except for setting a concentration of monomer sensitive to ultraviolet ray at 2 wt %, 4 wt % and 10 wt % and exposing the liquid crystal to ultraviolet ray for 5 minutes. By the polarization microscopy it was observed that in cases of the monomer concentrations of 2 wt % and 4 wt %, domains of four types different in the tilted-up direction coexisted after the voltage application commenced. Domains different in the tiled-up direction but the same twist direction were formed not in contact with each other via surfaces. If, however, in case of the monomer concentration at 10 wt %, disturbance in the orientation of the liquid crystal molecules was observed and the twisted angle was not 90 degrees. When no voltage was applied, a sufficient white color image was not obtained.

EXAMPLE 20

The liquid crystal display was prepared in the same manner as in EXAMPLE 12 except both for using an orientation film of polyvinylcinnamate added with 2 wt% of a mixture liquid at 1:1 of chlorobenzene and methylene chloride and for setting the burning temperature at 90° C., in addition for irradiation f an ultraviolet ray with a linear polarization. The direction of the linear polarization was the same as the rubbing direction. It was observed by the polarization microscopy that domains of four types different in the tilted-up direction coexisted after the voltage application commenced. Domains different in the tiled-up direction but the same twist direction were formed not in contact with each other via surfaces.

A polarization plate was provided on the liquid crystal display before the display was placed on a rotation stage and then a colorimeter BM-5A was placed in front of the display to measure the visible angle dependency of the optical property. The display was carried out in eight gray scales so that the visible angle dependency of the optical property was measured for every gray scales in all directions at an interval of 45 degrees. Within a view angle of 60 degrees, no inversion of the brightness between the gray scales was generated. The liquid crystal evaluator LCD-5000 was used to measure the contrast under a voltage application at 5V. The measured contrast was 200.1. The pretilted angle in the direction vertical to the linear polarization was measured by a crystal rotation method. The pretilted angle measured was almost 0 degree.

As in EXAMPLE 20, polyvinylcinnamate was applied and exposure to linearly-polarized ultraviolet ray was carried out. 1,4-di-(4-(6-acryloyloxyhexyloxy) benzoloxybenzene mixed with 1 wt % of a photopolymerization initiator IRGACURE651 was applied. The liquid crystal was heated up to a temperature of 50° C. for subsequent irradiation of ultraviolet ray. Thereafter, the liquid crystal was cooled down to a room temperature. The orientation having been defined in the nematic liquid crystal phase was fixed on the substrate.

EXAMPLE 21

A substrate was used which has an amorphous thin film transistor arrays wherein a single pixel has a size of 50 micrometers×150 micrometers and the number of pixels is 480×640×3 in addition a diagonal size of a display screen is 120 millimeters. On the top substrate, a color filter was provided. A common electrode with openings of 40 micrometers×5 micrometers is also provided entirely on the top substrate. The top substrate comprises a thin film transistor optical shielding layer made of chromium, a color filter layer, a over coating agent and the common electrode of an ITO thin film. A bottom electrode is provided with a thin film transistor and with a pixel electrode as well as a gate line and a drain line.

The two substrates were cleaned before a polyimide orientation agent JALS-428 was applied onto the substrates by an off-set printing. The substrates were then burned up two times at temperature of 90° C. and 220° C. The substrates were subjected to rubbing by use of a buff cloth of rayon. The rubbing direction differ from each other by 90 degrees between the substrates, wherein the rubbing directions are parallel to the diagonal directions of the substrates. Adhesive was applied on a peripheral region of the substrate before latex spheres having a diameter of 6 micrometers were dispersed, which will serve as spacers. The substrates were aligned and combined with each other under pressure so that the pixel arrays were aligned between the substrates. The combined substrates were placed in a vacuum bath for subsequent evacuation. Nematic liquid crystal ZLI4792 was injected, wherein 1 wt % of 4,4'-diacryloyloxybiphenylacrylate to liquid crystal and 1 wt % of benzoinmethylether to monomer were mixed to the namatic liquid crystal. Further, the nematic liquid crystal was added with a chiral agent of anticlockwise direction so that a spontaneous pitch became 70 micrometers. Thereafter, the liquid crystal was exposed to the ultraviolet ray, after which the liquid crystal still remained transparent.

The liquid crystal was observed by optical microscopy. After the voltage application commenced, the boundary between domains remained fixed over positions. A liquid crystal evaluator LCD-5000 was used to measure a response speed at a view angle of 30 degrees. The measured response speed was 30 milliseconds in ON-state and 40 millisecond in OFF-state.

The display was placed on a rotation stage and then a colorimeter BM-5A was placed in front of the display to measure the visible angle dependency of the optical property. The display was carried out in eight gray scales so that the visible angle dependency of the optical property was measured for every gray scales. Within a view angle of 40 degrees, no

EXAMPLE 22

A nematic liquid crystal ZLI4792 was added with 2 wt % of polymethylmethacrylate. Under nitrogen replacement condition, the nematic liquid crystal was heated up to 100° C. for 30 minutes so that polymethylmethacrylate was completely dissolved. The liquid crystal display was prepared in the same manner and the same conditions as in EXAMPLE 21 except for the above and for no ultraviolet irradiation. It was confirmed by optical microscopy that the boundary between domains remained fixed over positions after the voltage application commenced. A liquid crystal evaluator LCD-5000 was used to measure a response speed at a view angle of 30 degrees. The measured response speed was 30 milliseconds in ON-state and 40 millisecond in OFF-state.

COMPARATIVE EXAMPLE 6

The liquid crystal display was prepared in the same manner and the same conditions as in EXAMPLE 21 except that no monomer was added. It was confirmed by optical microscopy that the boundary between domains moved for not less than one second after the voltage application commenced. A liquid crystal evaluator LCD-5000 was used to measure a response speed at a view angle of 30 degrees. The measured response speed was 100 milliseconds in ON-state and 120 millisecond in OFF-state.

EXAMPLE 23

The liquid crystal display was prepared in the same manner and the same conditions as in EXAMPLE 21 except for providing an optical shielding layer. The same liquid crystal as EXAMPLE 21 was injected. The display was applied with a voltage of 2.0V which is higher by 0.1V than the threshold voltage of the liquid crystal. It was confirmed by optical microscopy that the boundary between domains generated immediately after the voltage application commenced moved to the opening. Ultraviolet ray as irradiated. Even when the voltage ON-OFF operations were repeated, no further movement of the boundary between domains was observed. The liquid crystal evaluator LCD-5000 was used to measure the contrast. The measured contrast was 150:1.

EXAMPLE 24

The liquid crystal display was prepared in the same manner and the same conditions as in EXAMPLE 22 except for using hexandioldiacrylate as monomer. It was confirmed by optical microscopy that the boundary between domains remained fixed over positions after the voltage application commenced. A liquid crystal evaluator LCD-5000 was used to measure a response speed at a view angle of 30 degrees. The measured response speed was 50 milliseconds in ON-state and 550 millisecond in OFF-state.

What is claimed is:

1. A nematic liquid crystal for a liquid crystal display, wherein domains of a first type which are different in tilted-up direction of liquid crystal molecules coexist as well as domains of a second type which are different in twist direction of liquid crystal molecules coexist.

2. The nematic liquid crystal as claimed in claim 1, wherein domains of four types which have different combinations of tilted-up direction of liquid crystal molecules and twist direction of liquid crystal molecules coexist.

3. The nematic liquid crystal as claimed in claim 2, wherein domains which are different both in tilted-up direction of liquid crystal molecules and uniform in twist direction of said liquid crystal molecules are not in contact with each other via surface boundary.

4. The nematic liquid crystal as claimed in claim 1, wherein said nematic liquid crystal is added with a chiral agent to make said nematic liquid crystal have a splay distortion.

5. The nematic liquid crystal as claimed in claim 1, wherein said nematic liquid crystal includes a polymer at a content in the range of 0.02 wt % to 4.0 wt%, the polymer being one of a polymerized photocurable monomer and a polymerized photocurable oligomer.

6. A nematic liquid crystal display, comprising:
   a first substrate provided with a common electrode;
   a second substrate provided with a pixel electrode, said second substrate being arranged to extend in parallel to said first substrate; and
   a liquid crystal cell which includes a nematic liquid crystal with a splay distortion, wherein domains of a first type which are different in tilted-up direction of liquid crystal molecules coexist as well as domains of a second type which are different in twist direction of liquid crystal molecules coexist.

7. The nematic liquid crystal display as claimed in claim 6, wherein domains of four types which have different combinations of tilted-up direction of liquid crystal molecules and twist direction of liquid crystal molecules coexist.

8. The nematic liquid crystal display as claimed in claim 7, wherein domains which are different both in tilted-up direction of liquid crystal molecules and uniform in twist direction of said liquid crystal molecules are not in contact with each other via surface boundary.

9. The nematic liquid crystal display as claimed in claim 6, wherein aid nematic liquid crystal is added with a chiral agent to make said nematic liquid crystal have a splay distortion.

10. The nematic liquid crystal display as claimed in claim 6, wherein said nematic liquid crystal is added with a polymer at a content in the range of 0.02 wt % to 4.0 wt %, the polymer being one of a polymerized photocurable monomer and a polymerized photocurable oligomer.

11. The nematic liquid crystal display as claimed in claim 6, further comprising at least an orientation film having a pretilted angle of not more than 0.5 degrees on at least any one said first and second substrates.

12. The nematic liquid crystal display as claimed in claim 11, wherein aid orientation film has a function to cause liquid crystal molecules to be oriented in a direction perpendicular to a rubbing direction.

13. The nematic liquid crystal display as claimed in claim 6, wherein said common electrode differ in shape and area from said pixel electrode to apply a non-uniform electric field to said liquid crystal.

14. The nematic liquid crystal display as claimed in claim 6, wherein said common electrode has at least an opening to apply a non-uniform electric field to said liquid crystal.

15. The nematic liquid crystal display as claimed in claim 14, further comprising an optical shielding layer which is aligned to said opening.

16. The nematic liquid crystal display as claimed in claim 6, wherein id pixel electrode has at least an opening to apply a non-uniform electric field to said liquid crystal.

17. The nematic liquid crystal display as claimed in claim 16, further comprising an optical shielding layer which is aligned to said opening.

18. The nematic liquid crystal display as claimed in claim 6, further comprising at least a compensation film having a negative refraction index on at least any one said first and second substrates.

19. A nematic liquid crystal display, comprising:
   a first substrate with a common electrode;
   a second substrate with a pixel electrode that has at least one opening for applying a non-uniform electric field; and
   a liquid crystal cell in which coexist plural domains of a first type with liquid crystal molecules with different tilted-up directions, and in which coexist plural domains of a second type with liquid crystal molecules with different twist directions.

20. The display of claim 19, wherein said liquid crystal cell comprises a polymer that is one of a polymerized monomer and a polymerized oligomer.

* * * * *